(12) United States Patent
Goto

(10) Patent No.: US 8,879,907 B2
(45) Date of Patent: Nov. 4, 2014

(54) MEASUREMENT APPARATUS, NETWORK DESIGN APPARATUS, TRANSMISSION SYSTEM, AND NETWORK MANAGEMENT APPARATUS

(71) Applicant: Fujitsu Limited, Kawasaki (JP)

(72) Inventor: Ryosuke Goto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 81 days.

(21) Appl. No.: 13/758,367

(22) Filed: Feb. 4, 2013

(65) Prior Publication Data

US 2013/0243421 A1 Sep. 19, 2013

(30) Foreign Application Priority Data

Mar. 16, 2012 (JP) ................................. 2012-060031

(51) Int. Cl.
| | |
|---|---|
| *H04B 10/00* | (2013.01) |
| *H04B 10/08* | (2006.01) |
| *H04B 10/12* | (2006.01) |
| *H04B 17/00* | (2006.01) |
| *H04B 10/07* | (2013.01) |

(52) U.S. Cl.
CPC ............. *H04B 10/07* (2013.01); *H04N 10/073* (2013.01)
USPC ............... 398/25; 398/29; 398/147; 398/158; 398/159

(58) Field of Classification Search
USPC .................. 398/16, 25, 29, 58, 147, 158, 159
See application file for complete search history.

(56) References Cited

U.S. PATENT DOCUMENTS

| 6,229,631 B1 | 5/2001 | Sato et al. |
|---|---|---|
| 8,014,668 B2 * | 9/2011 | Wan et al. ....................... 398/16 |
| 8,699,013 B2 * | 4/2014 | Ogawa .......................... 356/73.1 |
| 2009/0116833 A1 | 5/2009 | Shimizu et al. |

FOREIGN PATENT DOCUMENTS

| JP | 4-177141 | 6/1992 |
|---|---|---|
| JP | 6-174592 | 6/1994 |
| JP | 11-8590 | 1/1999 |
| JP | 2009-118101 | 5/2009 |

* cited by examiner

*Primary Examiner* — Dalzid Singh
(74) *Attorney, Agent, or Firm* — Staas & Halsey LLP

(57) ABSTRACT

A measurement apparatus includes: a transmitter disposed at a transmission-side node and configured to transmit two pulsed lights with different wavelengths at time intervals to a reception-side node; a transmission controller configured to control the transmitter so as to transmit the two pulsed lights repeatedly while changing the time interval; a receiving unit disposed at the reception-side node and configured to receive the two pulsed lights from the transmitter via one or more relay nodes; a detection unit configured to detect a change in a phase of at least one of the two pulsed lights received by the receiving unit; and a measurement unit configured to measure, based on the time interval and the change in a phase detected by the detection unit, a dispersion value of each transmission line between two nodes of nodes including the transmission-side node, the reception-side node, and the one or more relay nodes.

6 Claims, 19 Drawing Sheets

FIG. 14

| FIBER TYPE (CHROMATIC DISPERSION COEFFICIENT [ps/nm/km]) | SINGLE MODE FIBER (SMF) | DISPERSION SHIFTED FIBER (DSF) | NON-ZERO DISPERSION SHIFTED FIBER (NZ-DSF) |
|---|---|---|---|
| 0-20 | 20 | 20 | 20 |
| 20-40 | 18 | 8 | 13 |
| 40-60 | 16 | 6 | 11 |
| 60-80 | 14 | 5 | 9 |
| 80- | 12 | 4 | 8 |

TOTAL TRANSMISSION LINE LENGTH [km]

MEASUREMENT APPARATUS, NETWORK DESIGN APPARATUS, TRANSMISSION SYSTEM, AND NETWORK MANAGEMENT APPARATUS

CROSS-REFERENCE TO RELATED APPLICATION

This application is based upon and claims the benefit of priority of the prior Japanese Patent Application No. 2012-060031, filed on Mar. 16, 2012, the entire contents of which are incorporated herein by reference.

FIELD

The embodiments disclosed herein are related to a measurement apparatus, a network design apparatus, a transmission system, and a network management apparatus.

BACKGROUND

In an optical network, when a route (a path) from a transmission-side node to a reception-side node is designed, parameters associated with the route are measured based on a field investigation performed in advance. The parameters may include, for example, a number of transmission lines between the transmission-side node and the reception-side node, a distance of each transmission line, a transmission loss of each transmission line, and a chromatic dispersion coefficient of each transmission line.

Regarding the measurement of parameters, for example, Japanese Laid-open Patent Publication No. 6-174592 and Japanese Laid-open Patent Publication No. 4-177141 disclose a technique in which a measurement system including an optical fiber with a known length is connected to one branched transmission line of pulsed light and a chromatic dispersion coefficient (for example, 16 ps/km/nm for an SMF (Single Mode Fiber)) is measured based on a change in delay time with a change in wavelength of a pulsed light. It is also known to use an OTDR (Optical Time Domain Reflectmeter) method to measure a length, a transmission loss, and a chromatic dispersion coefficient of an optical fiber in a route based on a reflected light with respect to incident a pulsed light. Parameters obtained as a result of the measurement are used to evaluate a transmission performance of a route in designing the route.

For example, Japanese Laid-open Patent Publication No. 2009-118101 discloses a technique in which a parameter associated with a transmission performance of each of apparatuses located in a route is stored in the apparatus, and a cumulative value of the parameter is transmitted and received sequentially from one apparatus to a next apparatus, and the transmission performance of the line is evaluated in the apparatus located at the end of the line. Japanese Laid-open Patent Publication No. 11-008590 discloses a technique in which parameters associated with the transmission performance of apparatuses in a route are collected, a bit error rate or the like is calculated based on the collected parameters, and the apparatuses are controlled so as to minimize the bit error rate.

Routes in optical networks are becoming more complicated as new optical fibers are added to the networks to meet increasing requirements for communication and as mesh-type networks with many route patterns are introduced. In the case of an optical network of a type of a WDM (Wavelength Division Multiplexing) network including a wavelength division multiplexing apparatus, routes are manages for each wavelength, which results in an increase in complexity of routes. The wavelength division multiplexing apparatus is an apparatus configured to multiplex a plurality of wavelength signals. An example of a wavelength division multiplexing apparatus is an OADM (Optical Add-Drop Multiplexer).

The above-described measurement of parameters is performed for at least all routes being used from a transmission-side node to a reception-side node, which results in an increase in a time and cost to design the network and an increase in management burden. This problem is more significant when the route is dynamically switched to adapt to a time-dependent change in communication traffic, because a change occurs in the route condition.

On the other hand, in a case where the measurement is performed not for all routes but for particular routes, the number of routes to be measured may be reduced. However, even in this case, it takes a long time to measure all transmission lines in each route.

SUMMARY

For example, in the above-described pulsed a light method (such as that disclosed in Japanese Laid-open Patent Publication No. 6-174592 or Japanese Laid-open Patent Publication No. 4-177141), measuring of a pulsed light is performed at an end of a route and thus a cumulative value of chromatic dispersion coefficients over the all transmission lines is measured. In the pulsed light method, to obtain the cumulative value, it is difficult to perform measurement over all transmission lines at a time, and thus the measurement is performed separately for each transmission line, which results in a large burden. A similar problem may also occur in an optical phase shift method in which a chromatic dispersion coefficient is measured based on an optical phase shift detected using a modulated light. Furthermore, in the OTDR method described above, if a route includes a relay amplifier, the relay amplifier blocks a reflected light, which makes it difficult to perform measurement for all transmission lines at a time. Also in this case, the measurement is performed separately for each transmission line, which results in a large burden.

In a case where an optical network includes two or more domains that are managed separately, there is a possibility that a network configuration of some domain is not clear. In such a case, an investigation is performed to get to know the network configuration. When domains are managed by different companies or organizations, the investigation may be troublesome and may spend a lot of time.

According to an aspect of the embodiments, a measurement apparatus includes: a transmitter disposed at a transmission-side node and configured to transmit two pulsed lights with different wavelengths at time intervals to a reception-side node; a transmission controller configured to control the transmitter so as to transmit the two pulsed lights repeatedly while changing the time interval; a receiving unit disposed at the reception-side node and configured to receive the two pulsed lights from the transmitter via one or more relay nodes; a detection unit configured to detect a change in a phase of at least one of the two pulsed lights received by the receiving unit; and a measurement unit configured to measure, based on the time interval and the change in a phase detected by the detection unit, a dispersion value of each transmission line between two nodes of nodes including the transmission-side node, the reception-side node, and the one or more relay nodes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is table illustrating an example of a database used in an evaluation process.

DESCRIPTION OF EMBODIMENTS

Figure 1:
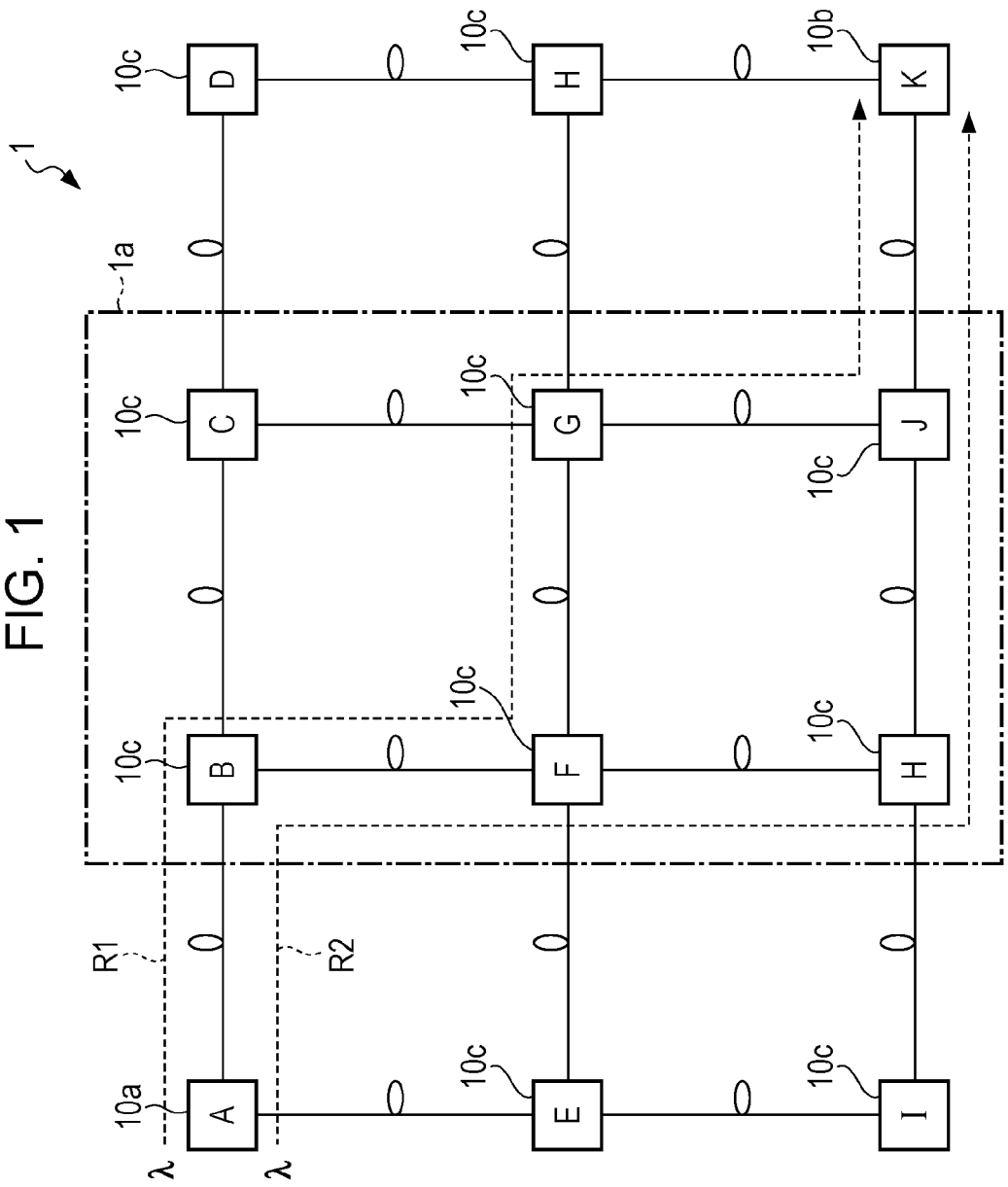
FIG. 1 is a diagram illustrating a configuration of an optical network according to an embodiment.

FIG. 1 illustrates a configuration of an optical network according to an embodiment. An optical network 1 includes a plurality of nodes (A) to (K) 10a, 10b, and 10c and is constructed in a form of a mesh. The nodes (A) to (K) 10a, 10b, and 10c are wavelength division multiplexing apparatuses such as OADMs which may be connected to each other via optical fibers. Note that connections among the nodes 10a to 10c may be implemented in a multiplexed form.

In the present embodiment, the node (A) 10a is a transmission-side node that transmits a light signal with a wavelength λ. On the other hand, the node (K) 10b is a reception-side node that receives the light signal. Other nodes (B) to (J) 10c are relay nodes which transfer the light signal. In a case where a light signal is transmitted from the node (A) 10a to the node (K) 10b, there are a plurality of routes in the optical network 1. For example, in one route R1, the light signal passes through the node (B) 10c, the node (F) 10c, the node (G) 10c, and the node (J) 10c in the order described above. In another route R2, the light signal passes through the node (B) 10c, the node (F) 10c, the node (H) 10c, and the node (J) 10c in the order described above.

When the network is designed, a route which is optimum in terms of transmission performance is selected from a plurality of routes between the transmission-side node (A) 10a and the reception-side node (K) 10b. The transmission performance may be evaluated using parameters measured for each transmission line between nodes 10a and 10c included in the routes.

Figure 2:
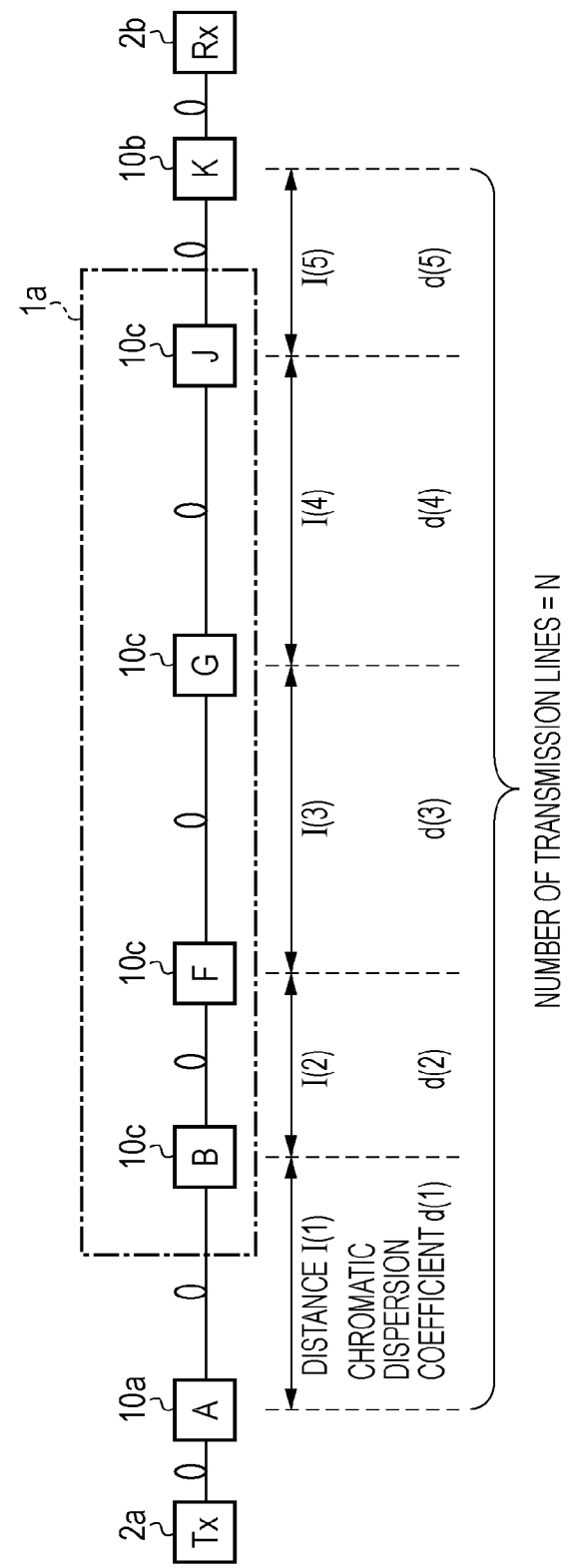
FIG. 2 is a diagram illustrating one of routes from a transmission-side node to a reception-side node.

FIG. 2 illustrates examples of parameters used in the evaluation of the transmission performance for a route R1 taken as an example. The parameters may include the number of transmission lines from the transmission-side node (A) 10a to the reception-side node (K) 10b (the number of transmission lines is 5 in the example illustrated in FIG. 2), the distances l(1) to l(5) of optical fibers used as the respective transmission lines, and the chromatic dispersion coefficients d(1) to d(5) associated with the propagation delays of the respective transmission lines. These parameters affect the transmission quality in transmission of a light signal from a transmitting end (Tx) 2a to a receiving end (Rx) 2b via the route R1. In the following discussion, the route R1 is taken as an example. Note that the discussion would be similar to that on the route R1.

It may not be easy to measure the parameters if the configuration of the optical network 1 is unclear. For example, as illustrated in FIG. 1, when the network 1 between the transmission-side node (A) 10a and the reception-side node (K) 10b includes a network is managed separately from other nodes, a configuration is not clear for a part between a relay node (B) 10c and a relay node (J) 10c in the route R1.

Figure 3:
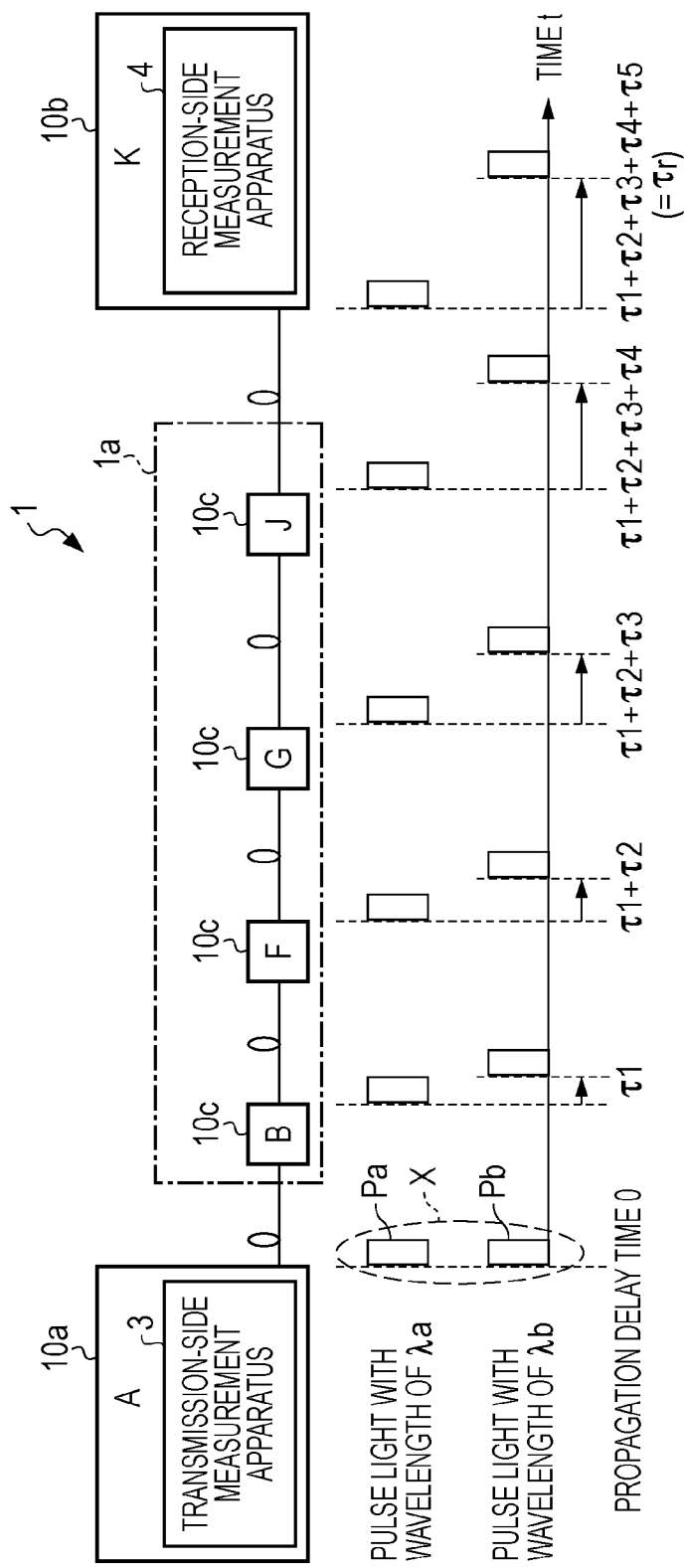
FIG. 3 is a diagram illustrating a propagation delay for two pulsed lights transmitted simultaneously.

In the present embodiment, as illustrated in FIG. 3, measurement apparatuses 3 and 4 are disposed such that one is at the transmission-side node (A) 10a and the other is at the reception-side node (K) 10b, such that it is possible to perform measurement regardless of the configuration between the relay node (B) 10c to the relay node (J) 10c in the network 1a. When the measurement is performed, the transmission-side measurement apparatus 3 disposed at the transmission-side node (A) 10a transmits two pulsed lights Pa and Pb with different wavelengths to the reception-side measurement apparatus 4 disposed at the reception-side node (K) 10b. The reception-side measurement apparatus 4 performs the measurement based on the received pulsed lights Pa and Pb.

The pulsed light Pa has a wavelength of λa and the pulsed light Pb has a wavelength of λb. The difference αλ between the wavelengths λa and λb is, for example, 1 nm. The width of each of the pulsed light Pa and the pulsed light Pb is set taking into account the length of the transmission line, the type of the optical fiber, and the chromatic dispersion value. More specifically, for example, the width of each of the pulsed light Pa and the pulsed light Pb is set to about 300 ps.

FIG. 3 illustrates a manner in which the pulsed light Pa and the pulsed light Pb propagate after they are transmitted at the same time. The pulsed light Pa and the pulsed light Pb have relative propagation delays due to the chromatic dispersion of the optical fiber. In FIG. 3, propagation delay times that occur in the respective transmission lines located successively from the transmission-side node (A) 10a to the reception-side node (K) 10b are respectively denoted by τ1, τ2, τ3, τ4, and τ5.

The cumulative values of the propagation delay times with reference to times at which the pulsed light Pa is output from the respective relay nodes (B) to (J) 10c are given as τ1, τ1+τ2, τ1+τ2+τ3, and τ1+τ2+τ3+τ4. The difference between the time at which the pulsed light Pa arrives at the reception-side node (K) 10b and that at which the pulsed light Pb arrives at the reception-side node (K) 10b is given by τr=τ1+τ2+τ3+τ4+τ5.

After the pulsed light Pa and the pulse Pb are output from the transmission-side measurement apparatus 3, a fluctuation occurs in an optical phase of each of the pulsed light Pa and the pulse Pb at a location (denoted by X in FIG. 3) near an output end of the transmission-side node (A) 10a due to cross phase modulation (XPM). The cross phase modulation is a nonlinear phenomenon that occurs in optical fibers.

Figure 4:
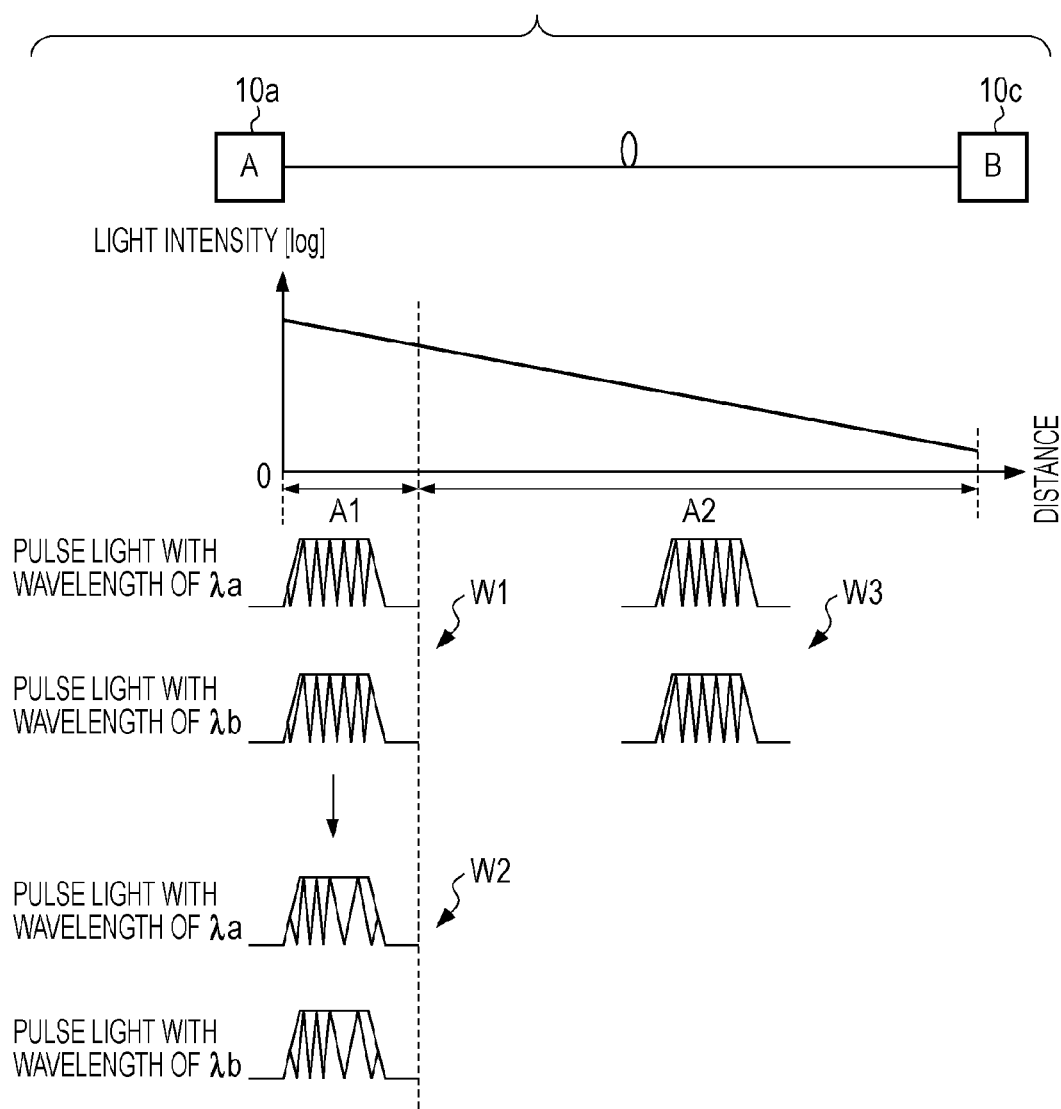
FIG. 4 is a diagram illustrating a cross phase modulation.

Referring to FIG. 4, the cross phase modulation is explained. In FIG. 4, a graph illustrates a change in light intensity of the pulsed light Pa and the pulse Pb as a function of a location from the transmission-side node (A) 10a to the relay node (B) 10c. As illustrated in this graph, when the light intensity is represented in logarithm, the light intensity decreases linearly with the location from the transmission-side node (A) 10a to the relay node (B) 10c due to a transmission loss along the optical fiber. In a segment A1 in which the light intensity is relatively high (for example, about 0 dBm), when the pulsed light Pa and the pulse Pb propagate along the optical fiber, if they overlap each other during the propagation (as denoted by a reference symbol W1), a fluctuation in an optical phase occurs due to the effect of the cross phase modulation (as denoted by a reference symbol W2). On the other hand in a segment A2 in which the light intensity is relatively low, no cross phase modulation occurs and thus ignorable fluctuation in an optical phase occurs (as denoted by a reference symbol W3).

In the present embodiment, the measurement apparatuses 3 and 4 measure the propagation delay times τ1 to τ5 by detecting the fluctuation in an optical phase, i.e., a change in an optical phase due the cross phase modulation. Each time the pulsed light Pa and the pulsed light Pb pass through the transmission-side node (A) 10a and the relay nodes (B) to (J) 10c, the pulsed light Pa and the pulsed light Pb are amplified by amplification apparatuses such as amplifiers disposed at the respective relay nodes (B) to (J) 10c. Therefore, if the difference in transmission time of the pulsed light Pa and the pulsed light Pb are is adjusted such that the pulsed light Pa and the pulsed light Pb overlap each other near output ends of the respective relay nodes (B) to (J) 10c, cross phase modulation occurs near the output ends. The cross phase modulation generated in this way is detected as a change in an optical phase at the reception-side node (K) 10b. Gains of the amplifiers disposed at the respective relay nodes (B) to (J) 10c may be adjusted such that an optical phase fluctuation due to cross phase modulation occurs.

Figure 5:
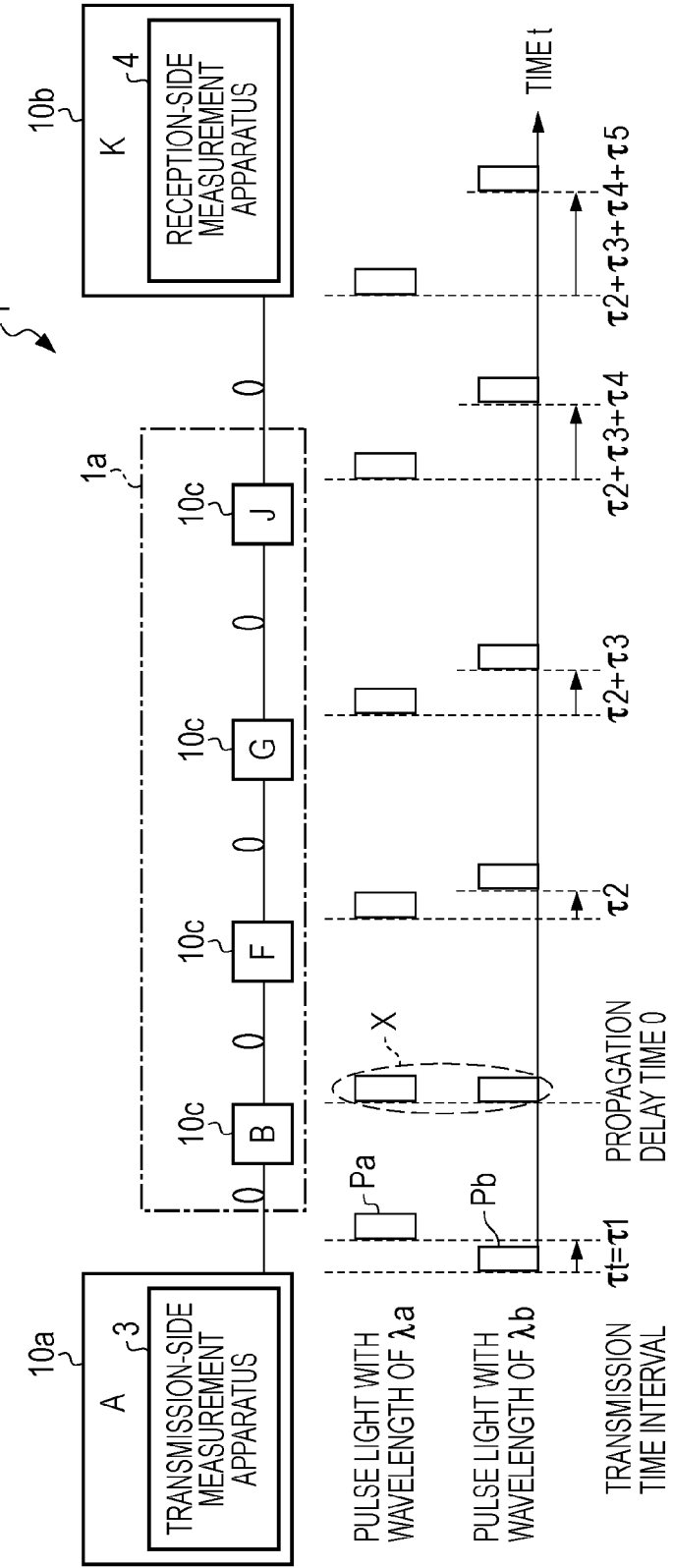
FIG. 5 is a diagram illustrating a propagation delay for two pulsed lights transmitted simultaneously.

FIG. 5 illustrates an example of a manner in which the pulsed light Pa and the pulsed light Pb propagate for a case in which the transmission time difference between the pulsed light Pa and the pulsed light Pb is τ1, i.e., the time interval τt=τ1. In this case, the propagation delay time τ1 between the transmission-side node (A) 10a and the relay node (B) 10c is reduced by the time interval τ1 produced at the transmission. As a result, the pulsed light Pa and the pulsed light Pb overlap each other near the output end of the relay node (B) 10c and thus an optical phase fluctuation due to cross phase modulation occurs (as denoted by X in FIG. 5).

Note that no overlap between the pulsed light Pa and the pulsed light Pb occurs at the output ends of the other relay node (F) to (J) 10c because relative propagation delays τ2, τ2+τ3, and τ2+τ3+τ4 occur at the respective relay nodes (F) to (J) 10c. Thus, in the route R1, a fluctuation in an optical phase occurs at the transmission-side node (A) 10a and at one of the relay nodes (B) to (J) 10c.

On the other hand, in a case where the time intervals are given by τt=τ1+τ2, τ1+τ2+τ3, and τ1+τ2+τ3+τ4, the pulsed light Pa and the pulsed light Pb overlap each other near an output end of another one of relay nodes (F), (G), and (J) 10c, and thus a fluctuation in an optical phase occurs. Therefore, the propagation delay times τ1 to τ5 along the respective transmission lines may be measured such that the transmission-side measurement apparatus 3 transmits the pulsed light Pa and the pulsed light Pb repeatedly while changing the time interval τt between them and the reception-side measurement apparatus 4 detects the change in an optical phase.

Figure 6:
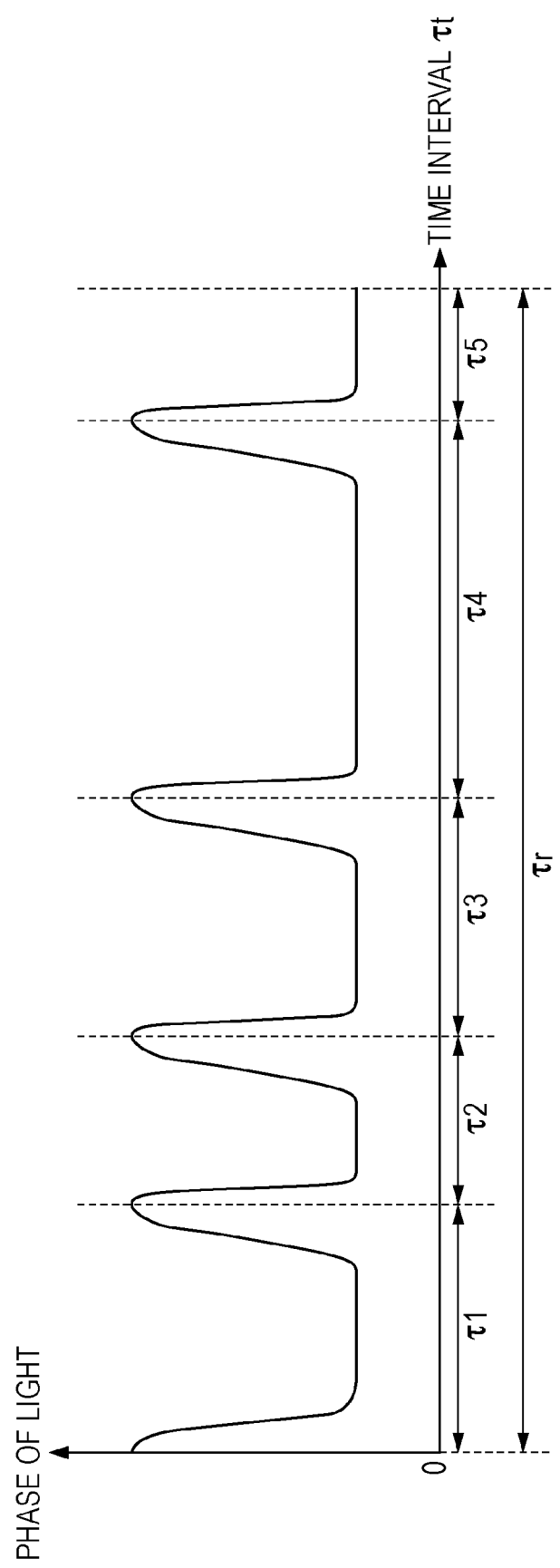
FIG. 6 is a graph illustrating a change in phase of a pulsed light with a change in time interval.

FIG. 6 illustrates the an optical phase as a function of the time interval τt between the pulsed light Pa and the pulsed light Pb over a range from 0 to τr (=τ1+τ2+τ3+τ4+τ5). Note that the time τr is given by a difference in arrival time at the reception-side node (K) 10b between the pulsed light Pa and the pulsed light Pb when the pulsed light Pa and the pulsed light Pb are transmitted at the same time, i.e., time interval τt=0.

In the present embodiment, the chromatic dispersion value of each transmission line is calculated from the propagation delay time along each transmission line from the transmission-side node 10a to the relay node 10c at which the fluctuation in an optical phase occurs. Alternatively, the chromatic dispersion value of each transmission line may be calculated from the propagation delay time along each transmission line from the relay node 10c at which the fluctuation in an optical phase occurs to the reception-side node 10b. Still alternatively, the chromatic dispersion value of each transmission line may be calculated from the propagation delay time along each transmission line between the relay node 10c at which the fluctuation in an optical phase occurs and the transmission-side node 10a and that between the relay node 10c and the reception-side node 10b.

A change in an optical phase is detected when a peak appears when the time interval τt=0, τ1, τ1+τ2, τ1+τ2+τ3, τ1+τ2+τ3+τ4. Therefore, by acquiring the number of times that a change in an optical phase is detected at the reception-side node (K) 10b, it is possible to measure the number, N, of transmission lines between the transmission-side node 10a and the reception-side node 10b (N=5 in the present example). The number of relay nodes 10c existing between the transmission-side node 10a and the reception-side node 10b is determined from the number N of transmission lines. More specifically, in the example illustrated in FIG. 2, the number transmission lines is N=5, and thus the number of relay nodes is given by N−1=4.

Each time a change in an optical phase is detected, if the time interval τt (=0, τ1, τ1+τ2, τ1+τ2+τ3, or τ1+τ2+τ3+τ4) is acquired, then the dispersion values are obtained for the respective transmission lines between the transmission-side node 10a and the reception-side node 10b. More specifically, for example, the dispersion values are calculated from the time intervals between the detections of fluctuation, i.e., the propagation delay times tin (=τ1 to τ5) according to a formula described below.

The propagation delay times τn of the respective transmission lines, the distances I(n), and the chromatic dispersion coefficients d(n), and the wavelength difference αλ between the pulsed light Pa and the pulsed light Pb have a relationship represented by an equation described below.

$$I(n) \times d(n) \times \alpha\lambda = \tau n (n=1 \text{ to } 5) \qquad (1)$$

Thus, the dispersion value Dn of each transmission line is given by a formula described below.

$$D(n) = I(n) \times d(n) = \tau n/Da, (n=1 \text{ to } 5) \quad (2)$$

In this formula, when the wavelength difference $\alpha\lambda=1$ nm, the dispersion value Dn of each transmission line is given by the propagation delay time $\tau n$ ($=\tau 1$ to $\tau 5$).

Figure 7:
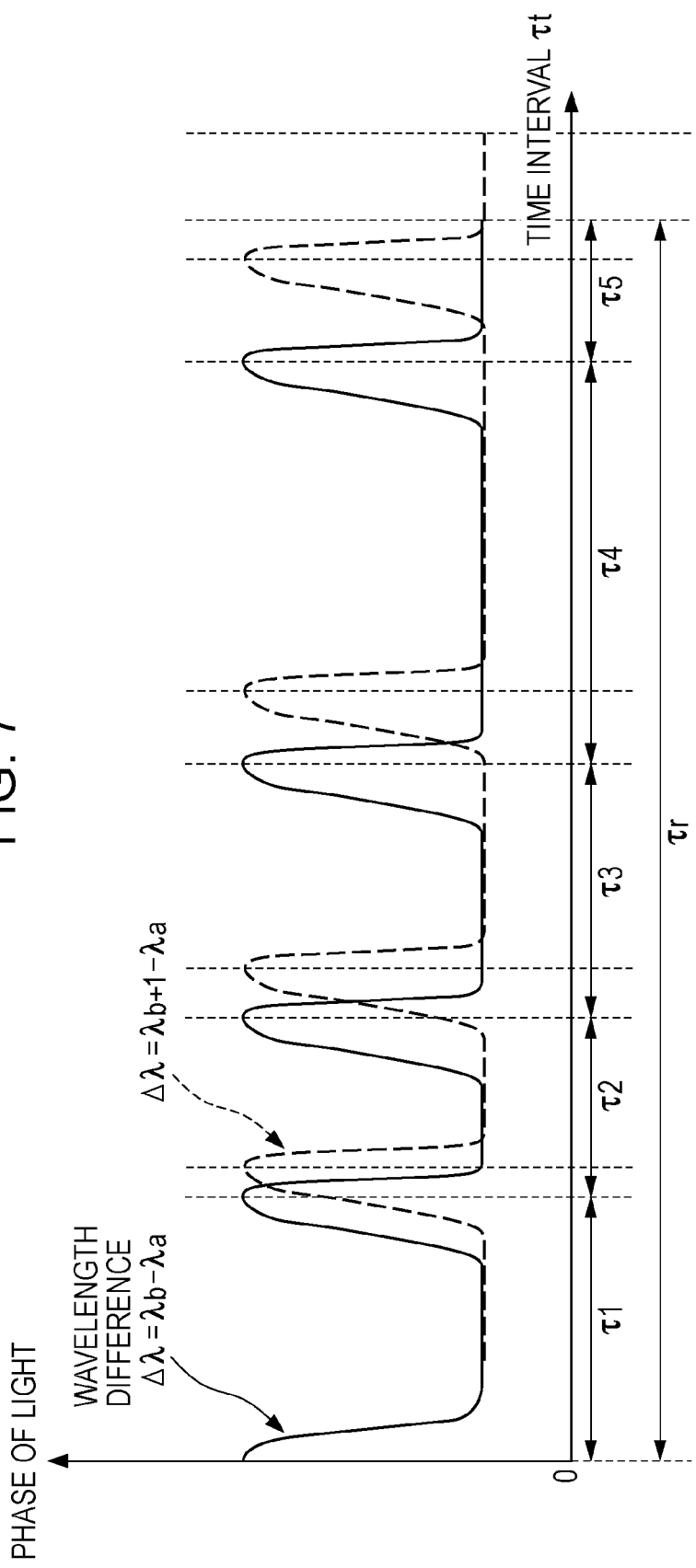
FIG. 7 is a graph illustrating a change in phase of a pulsed light with a change in time interval for different values of wavelength difference between two pulsed lights.

The chromatic dispersion coefficient do is obtained by repeatedly performing the measurement of the propagation delay time $\tau n$ while changing the wavelength difference $\alpha\lambda$ between the pulsed light Pa and the pulsed light Pb. FIG. 7 illustrates a result of the measurement of the propagation delay time $\tau n$ for a case in which the wavelength $\lambda b$ of the other pulsed light Pb is changed to $\lambda b+1$ ($>\lambda b$). In this case, the wavelength difference $\alpha\lambda$ is changed from $\lambda b-\lambda a$ to $\lambda b+1-\lambda a$.

As illustrated in FIG. 7, as the wavelength difference $\alpha\lambda$ changes, the propagation delay times $\tau 1$ to $\tau 5$ change. After the propagation delay times $\tau 1$ to $\tau 5$ along each transmission line are acquired by repeating the measurement as described above, the characteristic of the propagation delay time $\tau n$ depending on the change in the wavelength $\lambda b$ is calculated, for example, using a Sellmeier's dispersion formula.

Figure 8:
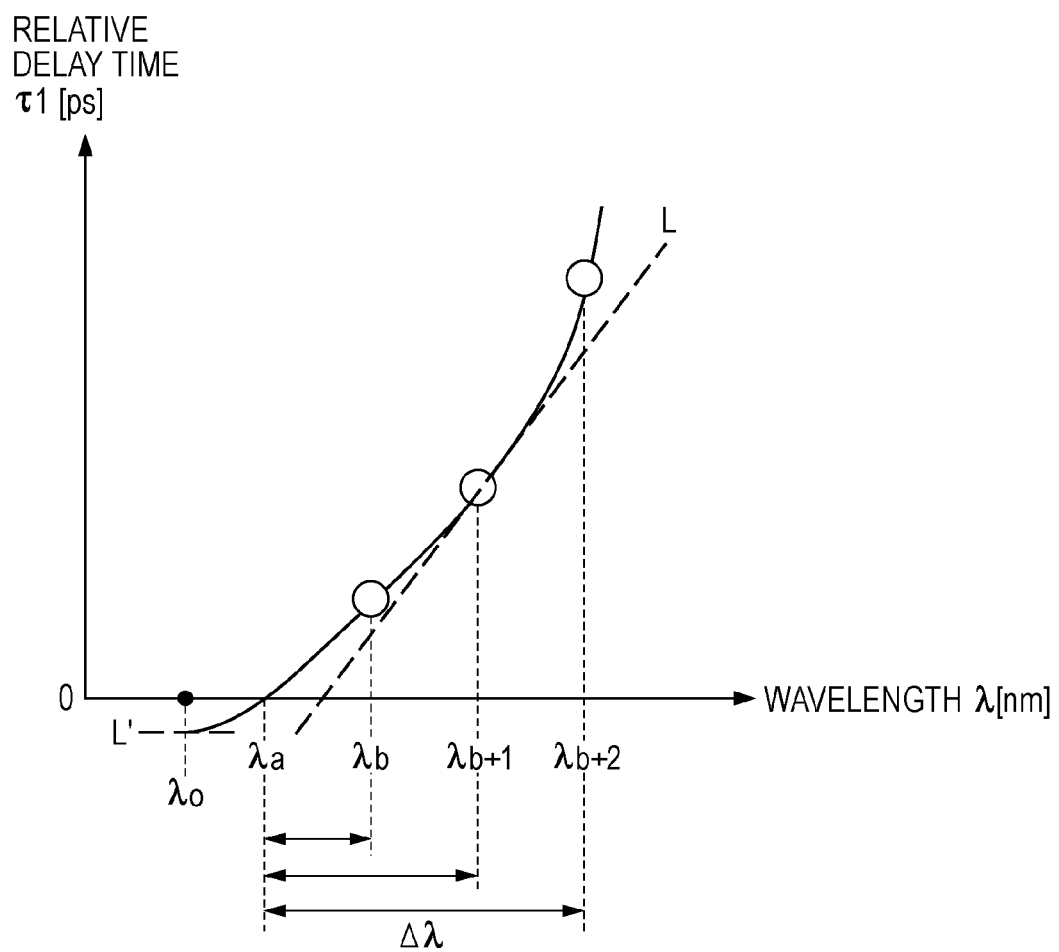
FIG. 8 is a graph illustrating a change in a propagation delay time with a change in wavelength difference between two pulsed lights.

FIG. 8 illustrates an example of a characteristic of the propagation delay time $\tau 1$ which varies with a change in wavelength $\lambda b$. The chromatic dispersion coefficient d1 is measured based on the dependence of the displacement of the propagation delay time $\tau 1$ on the displacement of the wavelength difference $\alpha\lambda$. That is, the chromatic dispersion coefficient d(1) is given by a derivative value of a characteristic curve (line L in FIG. 8). The derivative value of the characteristic curve is equal to 0 (line L' in FIG. 8) at a particular value of wavelength referred to as a zero-dispersion wavelength $\lambda o$ (nm). For other transmission lines, the chromatic dispersion coefficient d(n) and the zero-dispersion wavelength $\lambda o$ (nm) are measured in a similar manner.

The type of the optical fiber of each transmission line is identified based on the chromatic dispersion coefficient do obtained in the above-described manner. Examples of types of optical fibers include a single mode fiber (SMF), a dispersion shifted fiber (DSF), etc.

By rewriting equation (2) described above, an equation representing the distance I(n) as a function of the dispersion value D(n) and the chromatic dispersion coefficient d(n) is obtained as follows.

$$I(n) = D(n)/d(n) (n=1 \text{ to } 5) \quad (3)$$

Furthermore, a transmission loss of the optical fiber may be estimated from the distance I(n) and a typical parameter (for example, the transmission loss may be given by I(n)×0.2 (dB/kb)).

Figure 9:
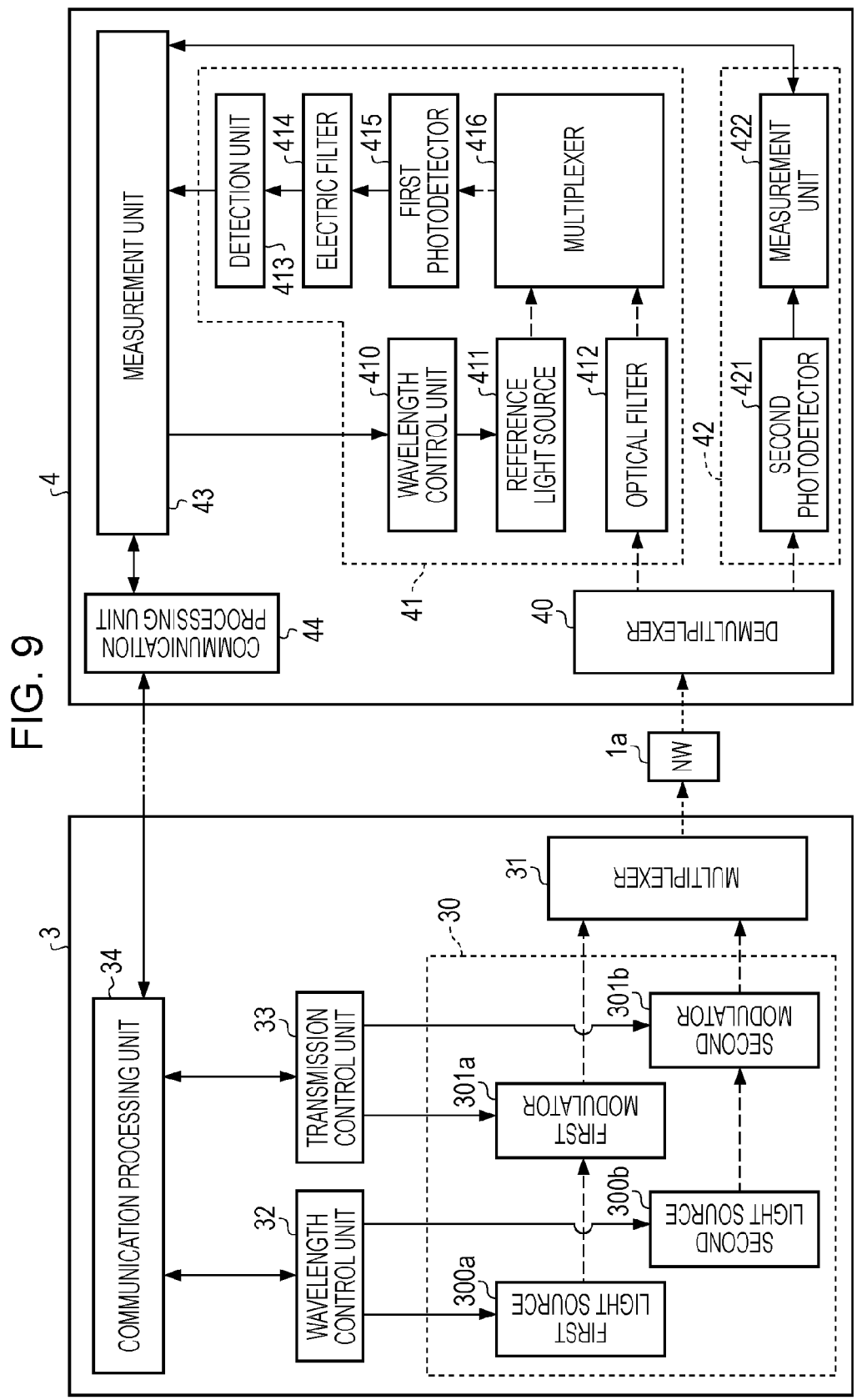
FIG. 9 is a diagram illustrating a configuration of a measurement apparatus.

Next, referring to FIG. 9, the configurations of the measurement apparatuses 3 and 4 are described below. The transmission-side measurement apparatus 3 includes a transmitter 30, a multiplexer 31, a wavelength controller 32, a transmission controller 33, and a communication processing unit 34. In FIG. 9, light signals are represented by dotted lines and electric signals are represented by solid lines. Note that signals are represented in a similar manner in other figures. The communication processing unit, the wavelength controller, and the transmission controller may be realized, for example, using one of one or more processor and memory or a field-programmable gate array (FPGA), and the like.

The transmitter 30 is disposed at the transmission-side node (A) 10a in the optical network 1 and the transmitter 30 transmits the pulsed light Pa and the pulsed light Pb with different wavelengths $\lambda a$ and $\lambda b$ at a time interval $\tau t$ to the reception-side node (K) 10b in the optical network 1. The transmitter 30 includes, for example, first and second light sources 300a and 300b and first and second modulators 301a and 301b. The first and second light sources 300a and 300b are respectively a wavelength variable light source configured to output light with a wavelength controlled by the wavelength controller 32. The first and second modulators 301a and 301b are respectively, for example, a LN (Lithium Niobate) modulator configured to generate pulsed light Pa or Pb from the light output from the first and second light sources 300a and 300b.

The wavelength controller 32 controls the wavelength difference $\alpha\lambda$ between the pulsed light Pa and the pulsed light Pb. For example, the wavelength controller 32 controls the wavelength such that the first and second light sources 300a and 300b generate light with the wavelengths equal to $\lambda a$ and $\lambda b$, respectively.

The transmission controller 33 controls the transmitter 30 such that the pulsed light Pa and the pulsed light Pb are transmitted repeatedly while changing the time interval $\tau t$. That is, the transmission controller 33 gives a timing control signal to the transmitter 30 thereby controlling the timing of transmitting the pulsed light Pa and the pulsed light Pb. The wavelength controller 32 and the transmission controller 33 are controlled by control signals received from the reception-side measurement apparatus 4 via the communication processing unit 34.

The pulsed light Pa and the pulsed light Pb output respectively from the first and second modulators 301a and 301b are input to the multiplexer 31. The multiplexer 31 is, for example, a photo coupler. The pulsed light Pa and Pb output from the multiplexer 31 are transmitted to the reception-side measurement apparatus 4 via the network 1a including the relay nodes (B) to (J) 10c.

The reception-side measurement apparatus 4 includes a demultiplexer 40, a fluctuation detection unit 41, a time difference detector 42, a measurement unit 43, and a communication processing unit 44. The demultiplexer 40 is, for example, a photo coupler. The pulsed light Pa and the pulsed light Pb received via the network is are input to the demultiplexer 40, which outputs the pulsed light Pa and the pulsed light Pb to the fluctuation detection unit 41 and the time difference detector 42. A fluctuation detection unit, a time difference detector, a measurement unit may be realized, for example, using one of one or more processor and memory, and a field-programmable gate array (FPGA), and an integrated circuit (IC).

The fluctuation detection unit 41 includes a wavelength controller 410, a reference light source 411, an optical filter 412, a detection unit 413, an electric filter 414, a first photodetector 415, and a multiplexer 416. The optical filter 412 is a filter that passes only light with the wavelength $\lambda a$ therethrough. As a result, of the pulsed light Pa and the pulsed light Pb output from the demultiplexer 40, only the pulsed light Pa is output to the multiplexer 416 located at a following stage. The communication processing unit 44, the measurement unit 43, and the wavelength controller 410 may be realized, for example, using a processor and a memory shared by these units, and/or a dedicated processor and memory.

The reference light source 411 functions as a wavelength variable light source configured to output reference light with a wavelength $\lambda c$ set by the wavelength controller 410 to the multiplexer 416. Note that the wavelength $\lambda c$ is set by the measurement unit 43 in the wavelength controller 410. The mixed light of the pulsed light Pa and the reference light output from the multiplexer 416 is received by the first photodetector 415 and converted into an electric signal. The first photodetector 415 is, for example, a photodiode. The electric filter 414 is, for example, a bandpass filter configured to pass only the electric signal with a frequency band input from the first photodetector 415.

The detection unit 413 detects a change in an optical phase of the pulsed light Pa received from the first photodetector 415. For example, the detection unit 413 detects a change in an optical phase of the pulsed light Pa based on the electric signal output from the electric filter 414 and the detection unit 413 outputs a resultant detection signal to the measurement unit 43.

Figure 10:
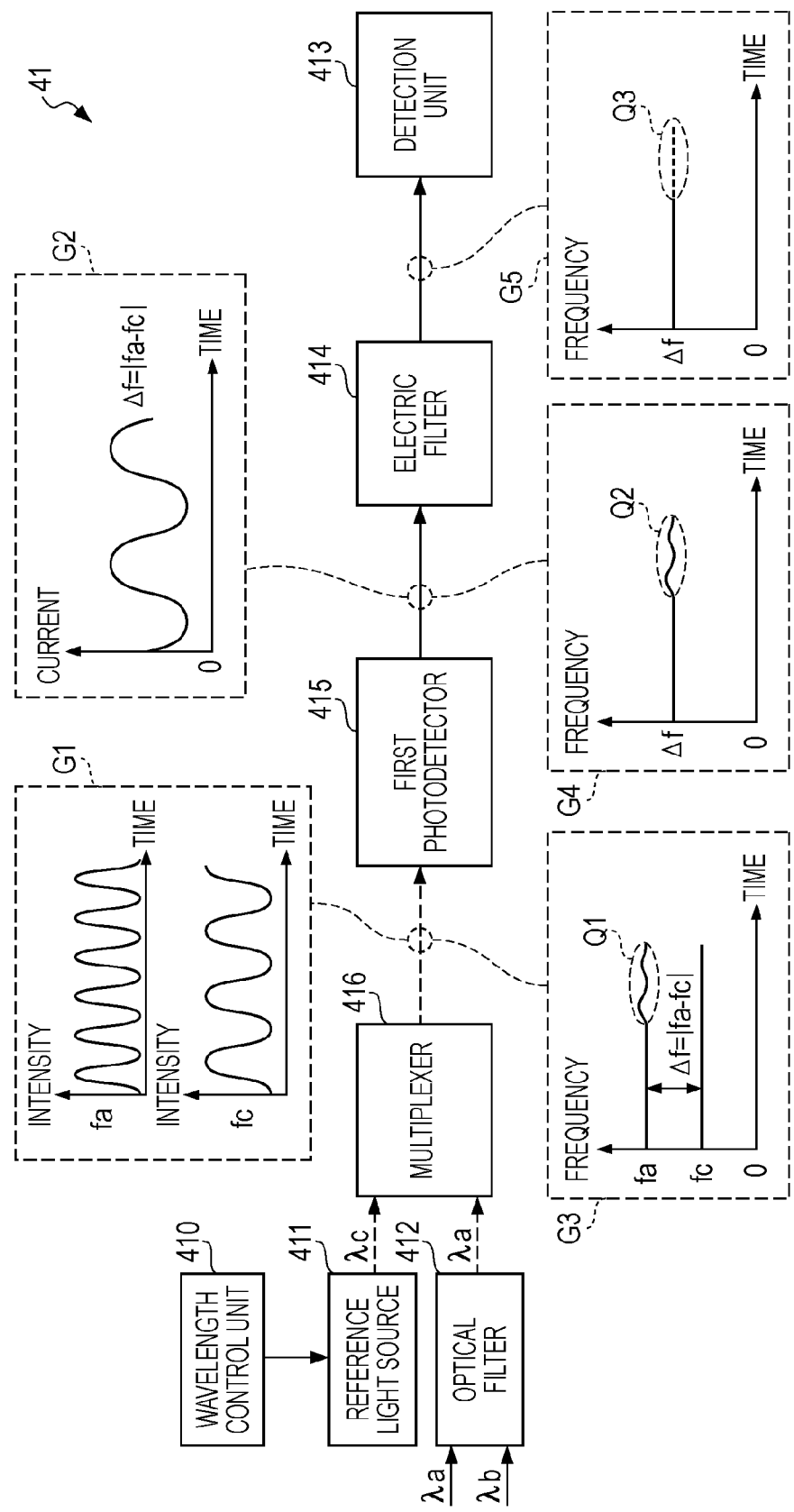
FIG. 10 is a diagram illustrating a method of detecting a fluctuation by a fluctuation detection unit.

FIG. 10 illustrates a method employed by the fluctuation detection unit 41 to detect a change in an optical phase. As illustrated in graph G1, the pulsed light Pa with a frequency fa and the reference light with a frequency fc are input to the first photodetector 415. In response, the first photodetector 415 outputs a beat signal vibrating at a frequency αf equal to the difference between the frequencies fa and fc as illustrated in graph G2.

If a fluctuation occurs in the an optical phase of the pulsed light Pa, then as illustrated in graph G3, a fluctuation occurs in the frequency fa (as denoted by Q1). Therefore, a fluctuation also occurs in the frequency αf of the beat signal output from the first photodetector 415 as represented by Q2 in graph G4.

Because the electric filter 414 allows only an electric signal with a frequency within a particular range to pass through, when the fluctuation Q2 occurs in the frequency αf, the output signal disappears as represented by Q3 in graph G5. The detection unit 413 detects this disappearance of the signal using an electric detection unit such as a voltage detection circuit. Note that the fluctuation detection unit 41 may be configured to detect a change in an optical phase for both the pulsed light Pa and the pulsed light Pb.

Referring again to FIG. 9, the time difference detector 42 includes a second photodetector 421 and a measurement unit 422. The second photodetector 421 is, for example, a photodiode and is configured to receive the pulsed light Pa and the pulsed light Pb and output an electric signal. That is, the first and second photodetectors 415 and 421 function as a receiving unit that is disposed at the reception-side node (K) 10b and that receives the pulsed light Pa and the pulsed light Pb from the transmitter 30 via the optical network 1.

The measurement unit 422 is disposed as the reception-side node (K) 10b and is configured to measure a difference in time of arrival at the second photodetector 421 between the pulsed light Pa and the pulsed light Pb transmitted simultaneously from the transmitter 30. More specifically, for example, for the pulsed light Pa and the pulsed light Pb transmitted at times separated by a time interval τt=0, the measurement unit 422 measures the arrival time difference τr by starting a timer when the pulsed light Pa arrives and acquiring a timer value at the time at which the pulsed light Pb arrives.

The measurement unit 422 outputs the measure arrival time difference τr to the measurement unit 43. The measurement unit 43 transmits the time difference τr to the transmission controller 33 in the transmission-side measurement apparatus 3 via the communication processing unit 44. The transmission controller 33 receives the time difference τr and changes the time interval τt over a range from 0 to the time difference τr. In this way, the value of τr is easily determined and the propagation delays τ1 to τ5 may be measured. The method of determining the time difference τr is not limited to that described above, but the time difference τr may be determined based on a propagation delay time estimated before the measurement.

The measurement unit 43 controls the measurement process to measure the parameters as described above. The measurement unit 43 includes a processing circuit such as a CPU (Central Processing Unit) or the like. The measurement unit 43 measures the dispersion value D(n) of each transmission line between two nodes of nodes including the transmission-side node 10a, the reception-side node 10b, and the relay nodes 10c based on the time interval τt corresponding to the change in an optical phase detected by the detection unit 413. The time interval τt may be controlled by either one of the measurement unit 43 and the transmission controller 33. In the latter case, the measurement unit 43 acquires the time interval τt from the transmission controller 33 via the communication processing unit 44.

As described above with reference to FIG. 6, the measurement unit 43 measures the number of transmission lines between the transmission-side node 10a and the reception-side node 10b based on the number of times a change in an optical phase is detected by the detection unit 413. The measurement unit 43 then measures the number of relay nodes 10c between the transmission-side node 10a and the reception-side node 10b based on the number of transmission lines. Furthermore, as described above with reference to FIG. 7 and FIG. 8, the measurement unit 43 measures the chromatic dispersion coefficient d(n) of each transmission line between the nodes 10a to 10c based on the displacement of the acquired time interval τt with the displacement of the wavelength difference αλ. Furthermore, the measurement unit 43 also measures the distance I(n) based on the dispersion value D(n) and the chromatic dispersion coefficient d(n).

The measurement unit 43 communicates with the transmission-side measurement apparatus 3 via the communication processing unit 44. The transmission-side measurement apparatus 3 and the reception-side measurement apparatus 4 are connected to each other via a communication network such as a LAN (Local Area Network) or the like such that control information used in the measurement process described above is transmitted/received.

Figure 11:
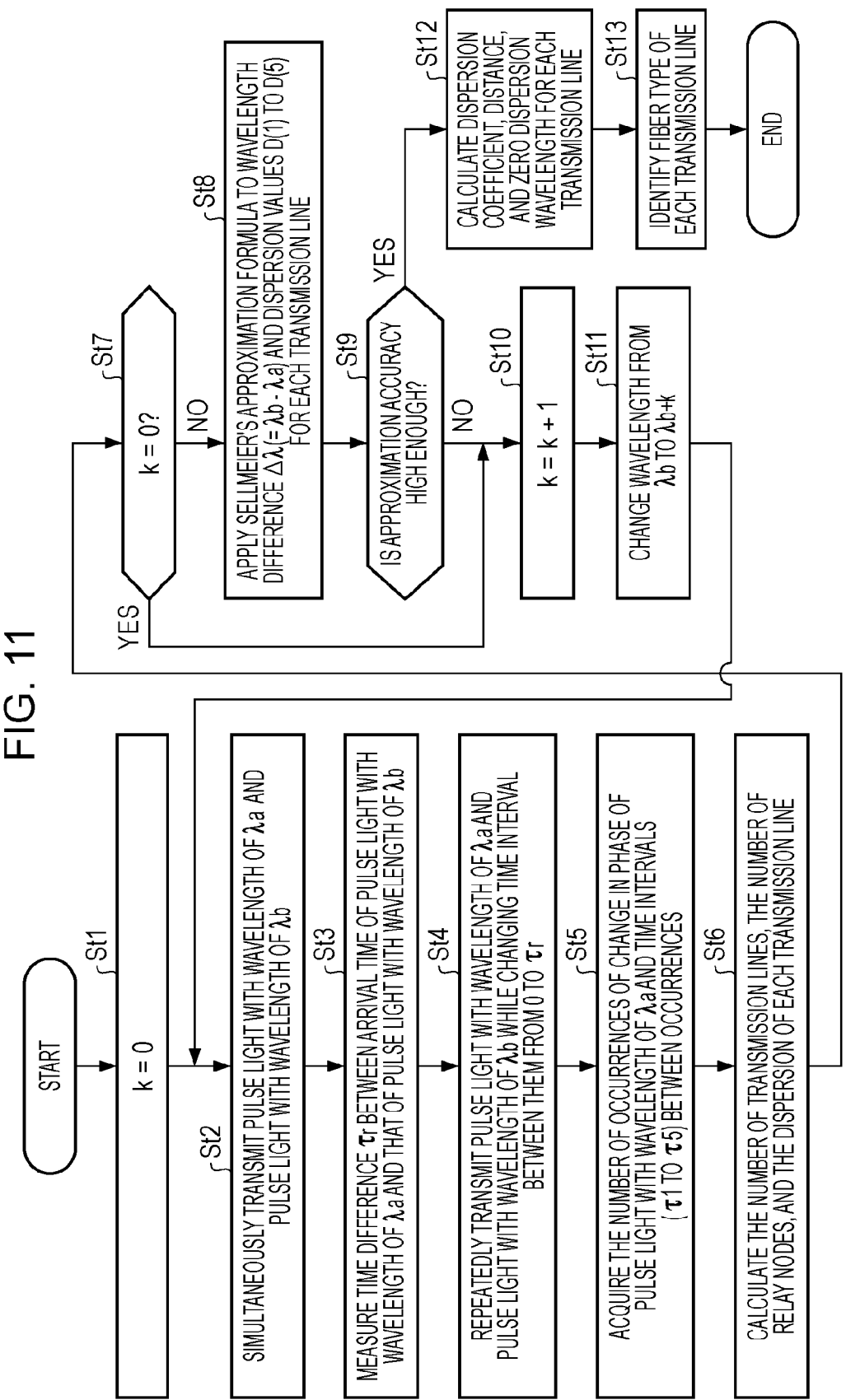
FIG. 11 is a flow chart illustrating a measurement process.

FIG. 11 illustrates a flow of the measurement process. At the beginning of the measurement process, the measurement unit 43 sets a variable k to 0 (k=0) (operation St1), and instructs the transmission controller 33 to start the measurement via the communication processing units 34 and 44.

The transmission controller 33 controls the transmitter 20 to simultaneously transmit the pulsed light Pa and the pulsed light Pb with the wavelengths λa and λb (operation St2). That is, the transmission controller 33 controls the transmitter 20 to transmit the pulsed light Pa and the pulsed light Pb with the wavelengths λa and λb such that the time interval τt is 0 (τt=0). Note that before the transmission is started, the wavelength controller 32 sets the first and second light sources 300a and 300b so as to respectively have wavelengths of λa and λb.

Thereafter, the time difference detector 42 measures the time difference τr between the arrival times of the pulsed light Pa and the pulsed light Pb transmitted in the process in operation St2, and the time difference detector 42 outputs the measured time difference τr to the measurement unit 43 (operation St3). The measurement unit 43 notifies the transmission controller 33 of the time difference τr via the communication processing units 34 and 44.

The transmission controller 33 controls the transmitter 30 to repeatedly transmit the pulsed light Pa and the pulsed light Pb while varying the time interval τt between the pulsed light Pa and the pulsed light Pb over a range from 0 to τr. Note that the transmission controller 33 may change the time interval τt in either an increasing direction or a decreasing direction as long as the time interval τt is scanned over the range from 0 to τr, as illustrated in FIG. 6. The value of each operation in which the time interval τt is varied may be properly determined depending on the target measurement accuracy.

Thereafter, the measurement unit 43 acquires information from the detection unit 413 in terms of the number of times a change in an optical phase is detected and the time intervals τ1 to τ5 (operation St5). Based on the acquired values, the measurement unit 43 measures the number N of transmission lines between the transmission-side node (A) 10a and the reception-side node (K) 10b, the number of relay nodes, and the dispersion values D(1) to D(5) of the respective transmission lines (operation St6).

The measurement unit 43 then determines whether the variable k=0 (operation St7). If the variable k=0 (i.e., if the answer to operation St7 is YES), then the measurement unit 43 increments the variable k by 1 such that k=k+1 (operation St10). The measurement unit 43 then instructs the wavelength controller 32 via the communication processing units 34 and 44 such that the wavelength of one pulsed light Pb is changed from λb to λb+1 (operation St11), and the measurement unit 43 instructs the transmission controller 33 to perform a remeasurement. As a result, the process from operation St2 to operation St6 is performed again.

In a case where the determination in operation St7 as to whether the variable k=0 is negative (i.e., the answer to operation St7 is NO), the measurement unit 43 applies the Sellmeier's dispersion formula to the wavelength difference αλ (=λb−λa) and the dispersion value D(n) for each transmission line (operation St8). The measurement unit 43 then determines whether the approximation accuracy of the Sellmeier's dispersion formula is high enough (operation St9). In this determination operation, for example, if the difference between the measured dispersion value D(n) and the corresponding approximate value is less than a given threshold value, it is determined that the approximation accuracy is high enough.

In a case where the determination in operation St9 is negative as to whether the approximation accuracy is high enough (i.e., the answer to operation St9 is NO), the process is repeated from operation St10. On the other hand, in a case where the determination in operation St9 is affirmative as to whether the approximation accuracy is high enough (i.e., the answer to operation St9 is YES), the measurement unit 43 measures the dispersion coefficient d(n), the distance I(n), and the zero-dispersion wavelength λo for each transmission line (operation St12). The measurement unit 43 then identifies the type of the fiber based on the dispersion coefficients d(1) to d(5) for each transmission line (operation St13). In this way, the measurement unit 43 measures the parameters.

In the present embodiment, the measurement apparatuses 3 and 4 measure each parameter by detecting, using the detection unit 413 disposed at the reception-side node (K) 10b, the change in an optical phase of the pulsed light Pa and the pulsed light Pb transmitted from the transmitter 30 disposed at the transmission-side node (A) 10a. Therefore, in the present embodiment, even when the optical network 1 includes the network is whose configuration is not clear, the measurement apparatuses 3 and 4 may easily measure the parameters at the transmission-side node (A) 10a and the reception-side node (K) 10b.

Figure 12:
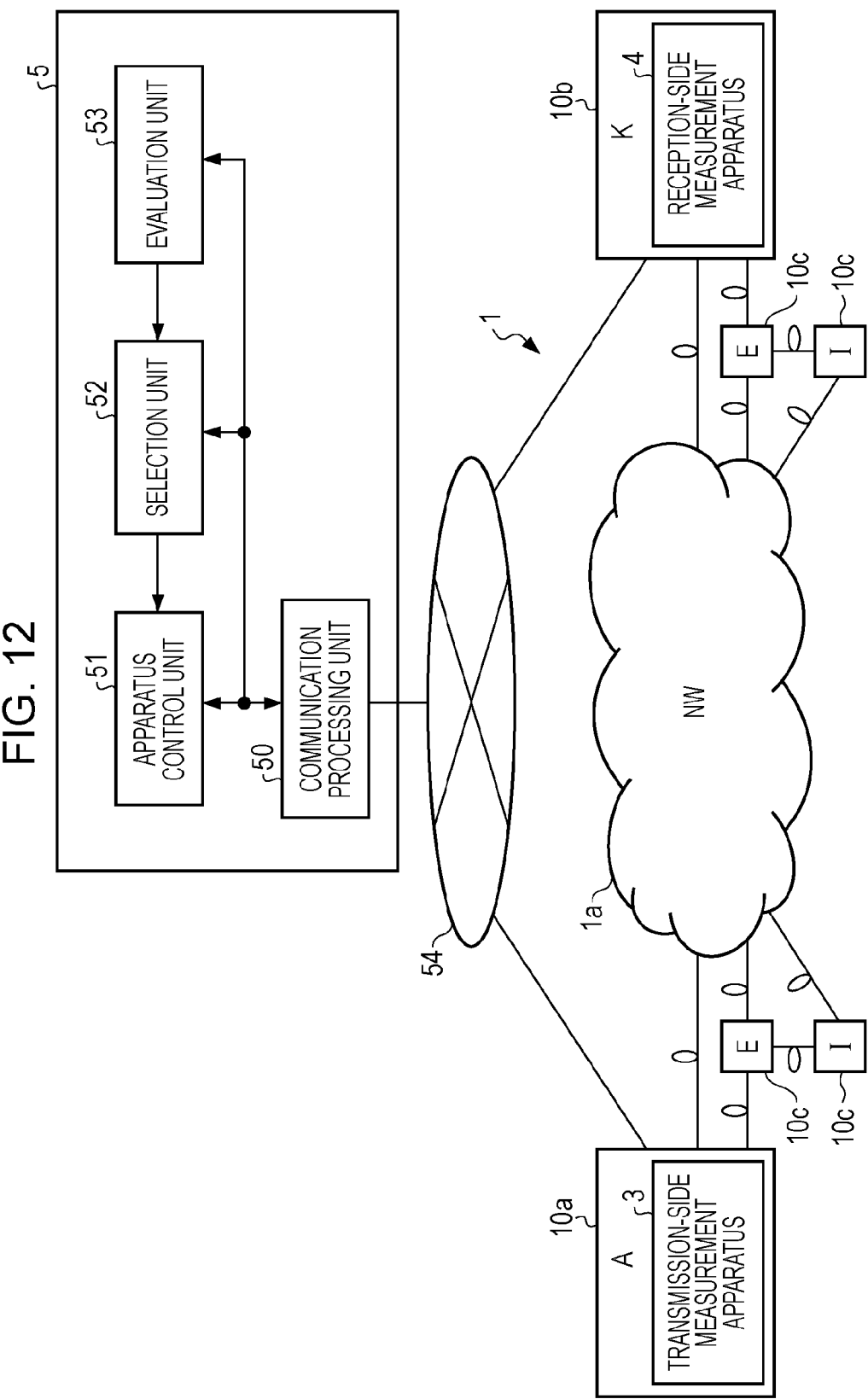
FIG. 12 is a diagram illustrating a configuration of a network management apparatus.

Next, a description is given below as to a network design apparatus configured to design a route of the optical network 1 based on the parameters measured using the above-described measurement method. FIG. 12 illustrates a configuration of a network management system (NMS) that manages the optical network. The network management system includes a network management apparatus 5 that manages transmission apparatuses located at the transmission-side node (A) 10a and the reception-side node (K) 10b.

In the present embodiment, the network management apparatus 5 also has a function of serving as a network design apparatus in addition to the function of managing the transmission apparatuses located in the optical network 1. The network management apparatus 5 includes a communication processing unit 50, an apparatus control unit 51, a selection unit 52, and an evaluation unit 53. The communication processing unit 50, the apparatus control unit 51, the selection unit 52, and the evaluation unit 53 may be realized, for example, using a processor and a memory shared by these units, and/or a dedicated processor and memory.

The communication processing unit 50 processes communication with the transmission apparatuses located at the transmission-side node (A) 10a and reception-side node (K) 10b via the communication network 54 such as a LAN or the like. The apparatus control unit 51 sets the transmission apparatuses located at the transmission-side node (A) 10a and the reception-side node (K) 10b.

The evaluation unit 53 acquires, from the measurement apparatuses 3 and 4 described above, at least one of the parameters measured by the measurement unit 43. Based on the acquired parameters, the evaluation unit 53 evaluates the transmission performance of one or more routes between the transmission-side node (A) 10a and the reception-side node (K) 10b. That is, the evaluation unit 53 evaluates the transmission performance based on the parameters obtained for the route R1 illustrated in FIG. 1 and additionally the route R2 and/or other routes.

Figure 13:
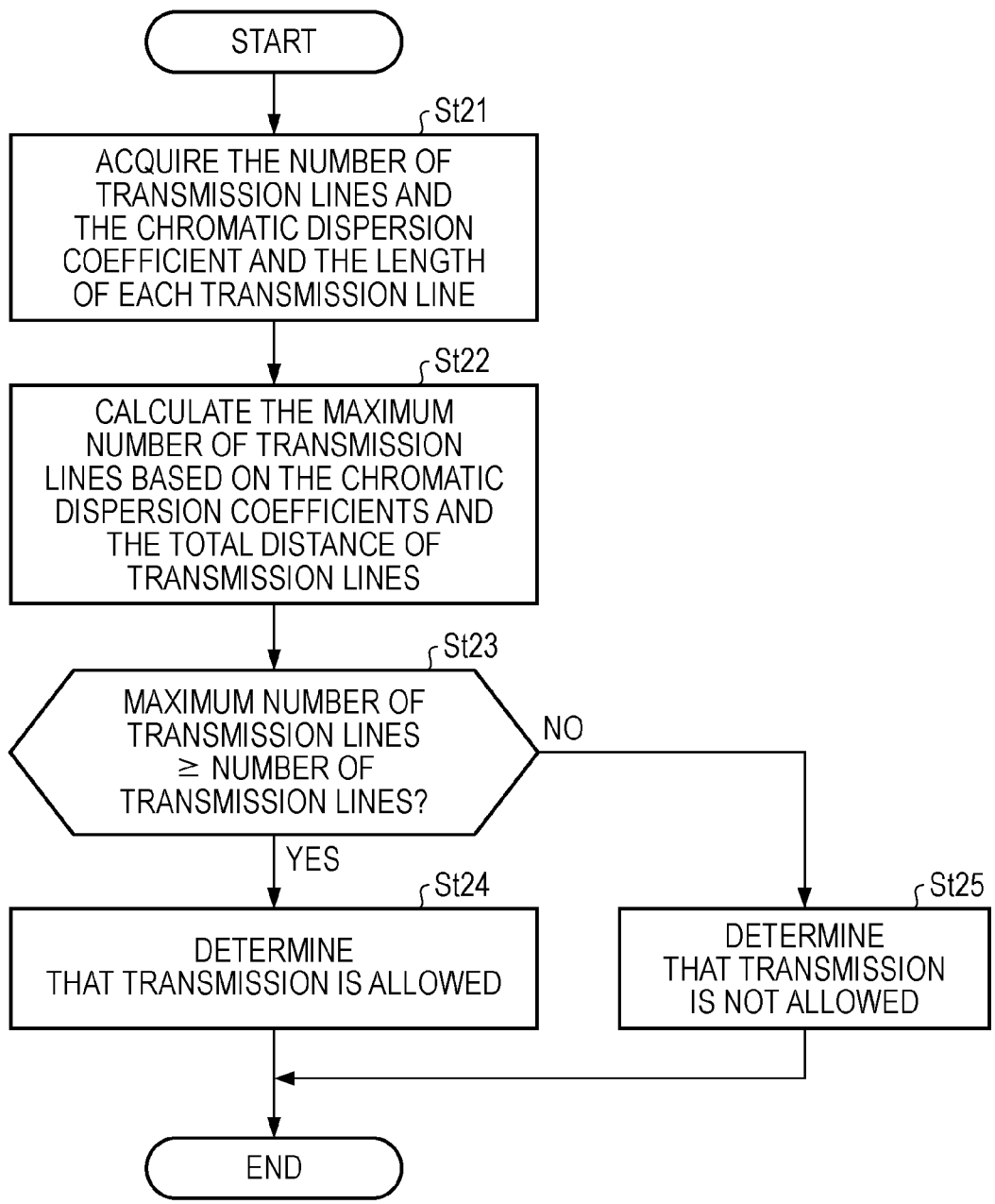
FIG. 13 is a flow chart illustrating a process of evaluating a transmission performance.

FIG. 13 illustrates a flow of the process of evaluating the transmission performance in which the number of transmission lines is taken as an example of a parameter. The evaluation unit 53 acquires, from the measurement unit 43 via the communication network 54, the number N of transmission lines, the chromatic dispersion coefficient d(n), and the distance I(n) of each of particular routes (operation St21).

Thereafter, the evaluation unit 53 may calculate the maximum number of available transmission lines based on the chromatic dispersion coefficient d(n) and at least the total distance I(n) of the transmission lines being in operation (operation St22). The maximum number of transmission lines may be acquired by performing simulation for various conditions. Instead of performing the simulation each time the maximum number of transmission lines, simulation may be performed in advance and values obtained via the simulation may be stored in advance in a database such that the maximum number of transmission lines may be acquired from the database.

An example of such a database is illustrated in FIG. 14. In this example of the database, the maximum number of transmission lines available in a route is described for various values of the total distance of transmission lines (i.e., I(1)+I (2)+ . . . +45)) and for various types of fibers (i.e., the chromatic dispersion coefficients d(n)). For example, when the type of the fiber is a single-mode fiber and the total distance of 50 km, the maximum number of available transmission lines is 16. Note that in this example of the database, it is assumed that each transmission line uses the same type of fiber. Although the types of fibers described in this example include a single-mode fiber (SF), a dispersion shifted fiber (DSF), and a non-zero dispersion shifted fiber (NZ-DSF), the types of fibers are not limited to those.

Referring again to FIG. 13, the evaluation unit 53 compares the number, N, of transmission lines measured by the measurement unit 43 with the maximum number of available transmission lines (operation St23). In a case where the maximum number of available transmission lines ≥ the measured number, N, of transmission lines (i.e., the answer to operation St23 is YES), the evaluation unit 53 determines that the route of interest is available for transmission (operation St24). On the other hand, in a case where the maximum number of available transmission lines < the measured number, N, of transmission lines (i.e., the answer to operation St23 is NO), the evaluation unit 53 determines that the route of interest is not usable for transmission (operation St25). The value evaluated by the evaluation unit 53 is not limited to the number of transmission lines, but the evaluation unit 53 may evaluate other values. For example, the evaluation unit 53 may evaluate a loss budget (maximum acceptable transmission loss) between the transmitting end 2a and the receiving end 2b (see FIG. 2) based on the sum of measured distances I(n).

The selection unit 52 illustrated in FIG. 12 selects one of routes based on a result of the evaluation performed by the evaluation unit 53. For example, the selection unit 52 may acquire information from the evaluation unit 53 from the result of the evaluation for each of the route R1 and route R2 illustrated in FIG. 1, and may select a route evaluated as being usable for transmission. In a case where the evaluation indicates that both routes R1 and R2 are available for transmission, the selection unit 52 may select a route with a highest transmission performance in terms of, for example, the number of transmission lines, the propagation delay, the loss budget, and/or the like.

The apparatus control unit 51 controls a plurality of transmission apparatuses in the optical network 1 such that a light signal is transmitted/received between the transmission-side node (A) 10a and the reception-side node (K) 10b via the route selected by the selection unit 52. In the example of the configuration illustrated in FIG. 12, the transmission apparatuses to be controlled are the transmission-side node (A) 10a and the reception-side node (K) 10b. In a case where other relay nodes (B) to (3) 10c are also managed by the network management apparatus 5, these apparatuses are also controlled by the apparatus control unit 51.

Figure 15:
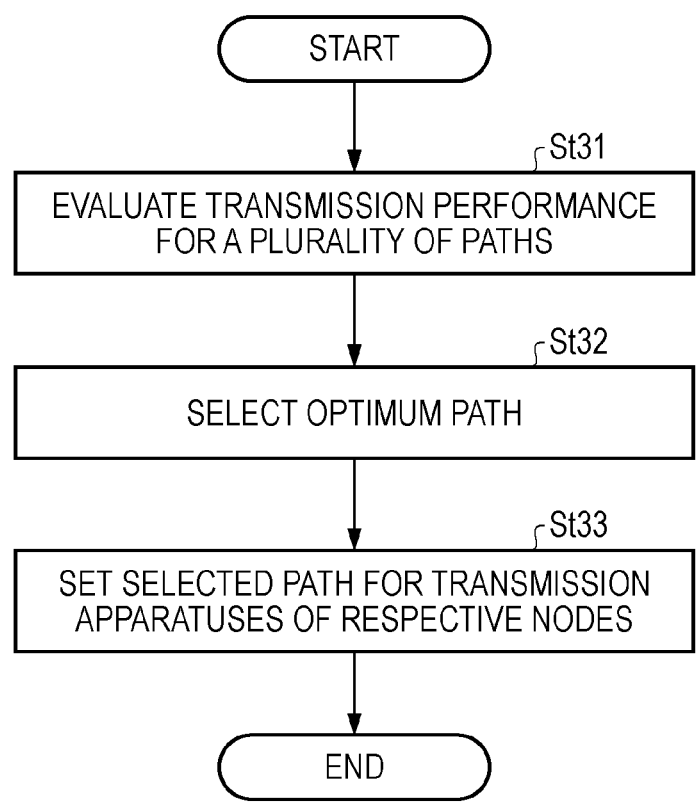
FIG. 15 is a flow chart illustrating a process performed by a network management apparatus.

FIG. 15 illustrates a flow of the process performed by the network management apparatus 5. The network management apparatus 5 evaluates, using the evaluation unit 53, the transmission performance of a plurality of routes from the transmission-side node (A) 10a to the reception-side node (K) 10b (operation St31). Thereafter, the network management apparatus 5 selects, using the selection unit 52, a most suitable route from the plurality of routes based on the result of the evaluation on the transmission performance (operation St32). The network management apparatus 5 then sets, using the apparatus control unit 51, a plurality of transmission apparatuses in the optical network 1 such that the selected route is employed in communication (operation St33). In this way, the network management apparatus 5 evaluates routes in the optical network 1 and performs the setting.

In the present embodiment, the network management apparatus 5 a route in the optical network 1 is determined based on the parameters measured by the measurement apparatuses 3 and 4 described above, and transmission apparatuses are controlled such that communication is performed via the selected route. Therefore, the network management apparatus 5 according to the present embodiment simplifies the designing and the setting of the route.

Figure 16:
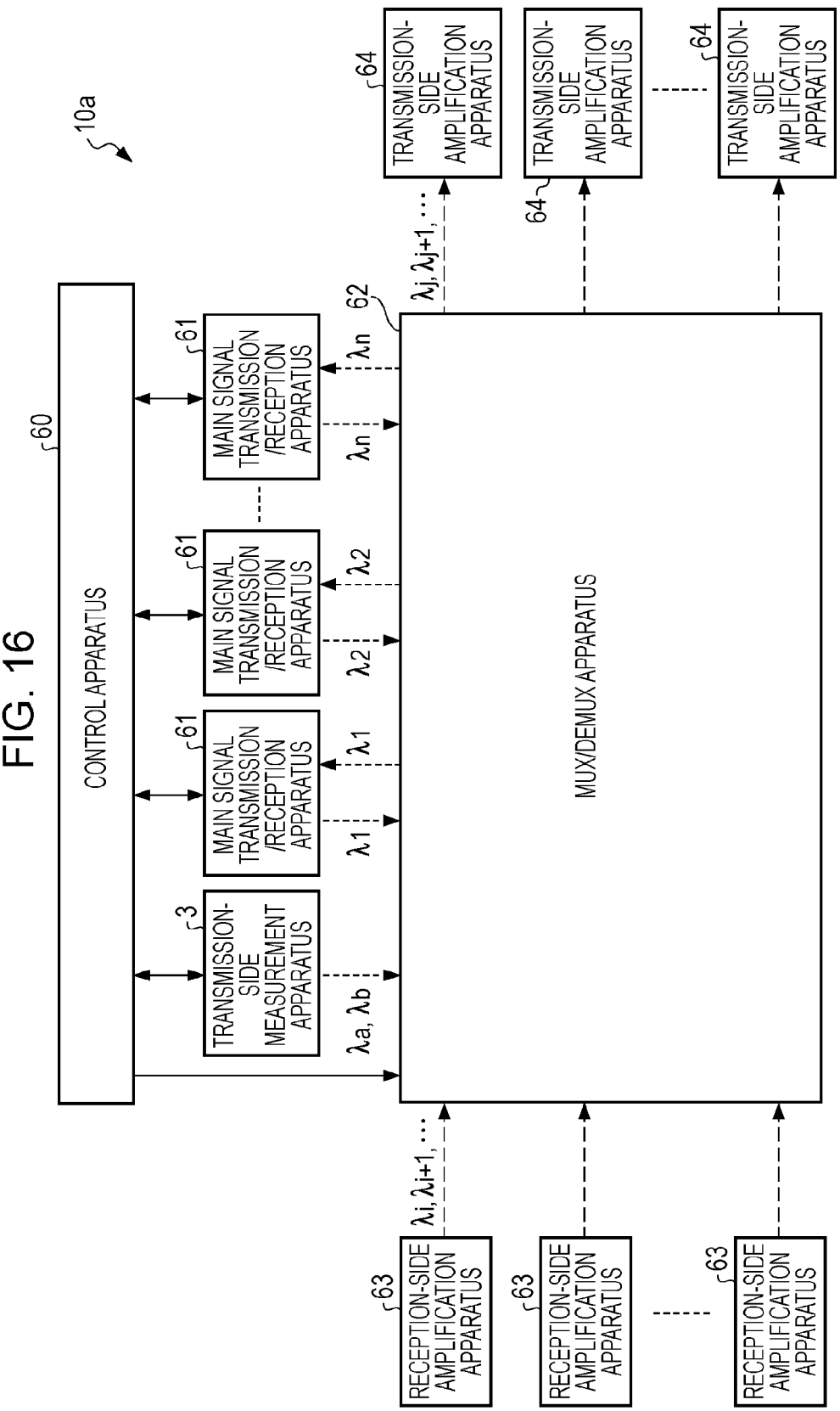
FIG. 16 is a diagram illustrating a configuration of a wavelength division multiplexing apparatus disposed at a transmission-side node.

FIG. 16 illustrates a configuration of a wavelength division multiplexing apparatus at the transmission-side node (A) 10a. The wavelength division multiplexing apparatus includes a transmission-side measurement apparatus 3, a control apparatus 60, a plurality of main signal transmission/reception apparatuses 61, a MUX/DEMUX apparatus 62, a plurality of reception-side amplification apparatuses 63, and a plurality of transmission-side amplification apparatuses 64.

The main signal transmission/reception apparatuses 61 each include a transmission apparatus configured to transmit a light signal with one of wavelengths $\lambda 1, \lambda 2, \ldots \lambda n$ and a receiving apparatus configured to receive a light signal with such a wavelength. The MUX/DEMUX apparatus 62 includes, for example, a plurality of wavelength selectable switches (WSS's) and is configured to transmit/receive a light signal to/from each main signal transmission/reception apparatus 61, each reception-side amplification apparatus 63, and each transmission-side amplification apparatus 64.

For example, when the MUX/DEMUX apparatus 62 receives light signals from main signal transmission/reception apparatuses 61, the MUX/DEMUX apparatus 62 multiplexes these received signals into light signals with wavelengths $\lambda j, \lambda j+1$ input from the reception-side amplification apparatuses 63 and outputs the resultant multiplexed signal to the transmission-side amplification apparatuses 64. The MUX/DEMUX apparatus 62 extracts a light signal with a particular wavelength from the light signals with wavelengths $\lambda i, \lambda i+1$ input from the reception-side amplification apparatuses 63 and outputs the extracted light signal to the main signal transmission/reception apparatus 61.

The reception-side amplification apparatuses 63 and the transmission-side amplification apparatuses 64 respectively include an optical amplifier or the like that amplifies a light signal The reception-side amplification apparatuses 63 and the transmission-side amplification apparatuses 64 are disposed so as to adapt to the routes connected to the transmission-side node (A) 10a and respectively connected to adjacent nodes in the optical network 1. More specifically, in the example illustrated in FIG. 1, the transmission-side node (A) 10a is connected to the relay nodes (B) and (E) 10c, and thus two sets of reception-side amplification apparatuses 63 and transmission-side amplification apparatuses 64 are disposed.

The control apparatus 60 includes a processing circuit such as a CPU (Central Processing Unit) and a communication processing circuit configured to process a communication with the network management apparatus 5 described above. The control apparatus 60 communicates with the network management apparatus 5 via the communication network 54. The control apparatus 60 receives route information indicating a route selected by the selection unit 52 from the network management apparatus 5, and the control apparatus 60 sets the main signal transmission/reception apparatuses 61 and the MUX/DEMUX apparatus 62 according to the received route information.

More specifically, the control apparatus 60 determines the wavelength of the light signal and the direction in which the light signal is to be transmitted based on the route information, and the control apparatus 60 sets the main signal transmission/reception apparatuses 61 and the MUX/DEMUX apparatus 62. The setting is performed, for example, on wavelength selectable switches in the MUX/DEMUX apparatus 62 and a wavelength control circuit of a light source in the main signal transmission/reception apparatus 61.

When the transmission-side measurement apparatus 3 performs the measurement process, the transmission-side measurement apparatus 3 communicates with the reception-side measurement apparatus 4 via the control apparatus 60. In this process, the control apparatus 60 sets the MUX/DEMUX apparatus 62 such that the pulsed light Pa and the pulsed light Pb with wavelengths $\lambda a$ and $\lambda b$ output from the transmission-side measurement apparatus 3 are output to the transmission-side amplification apparatus 64 corresponding to the route to be measured.

Figure 17:
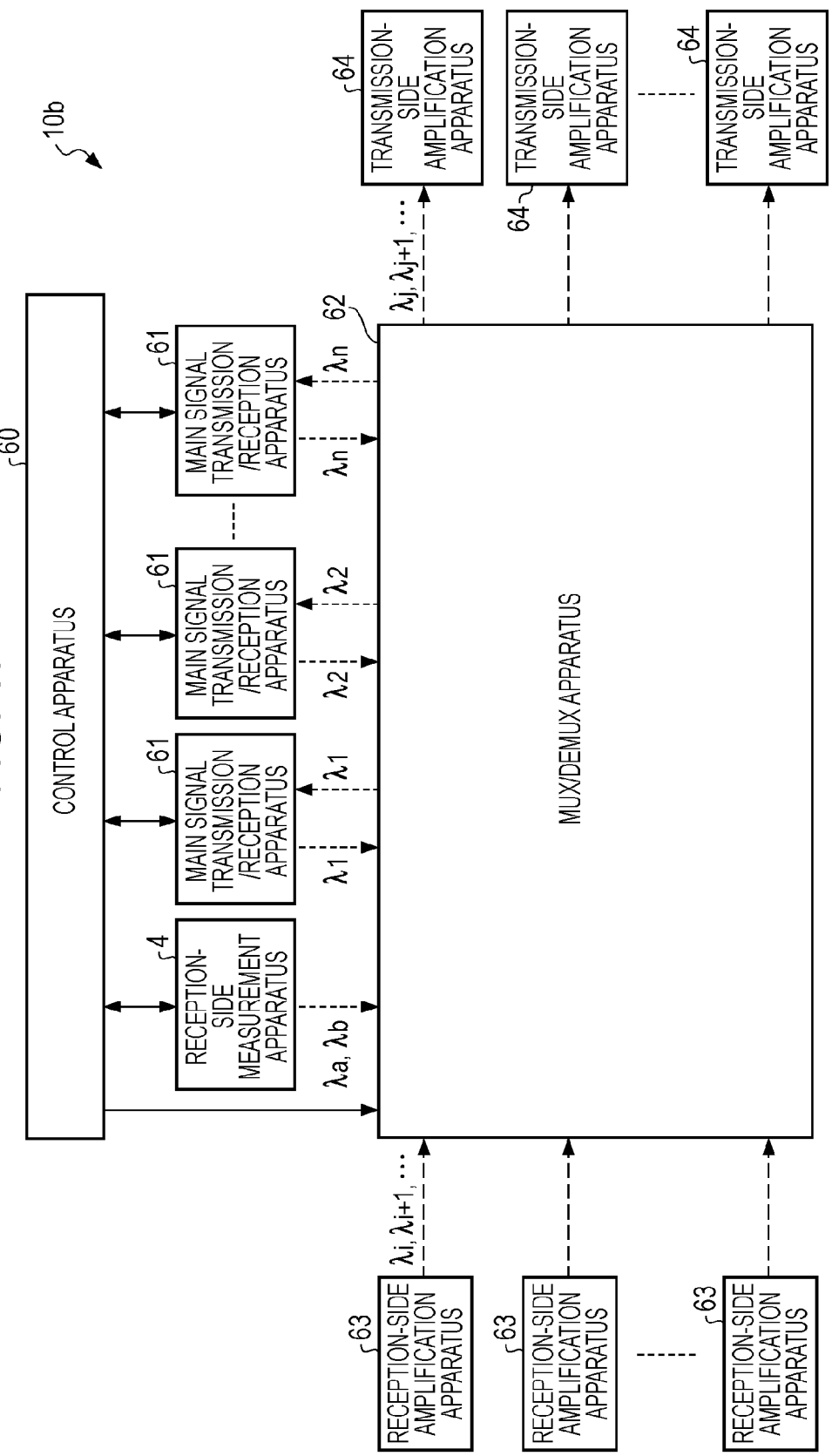
FIG. 17 is a diagram illustrating a configuration of a wavelength division multiplexing apparatus disposed at a reception-side node.

FIG. 17 illustrates a wavelength division multiplexing apparatus disposed at the reception-side node (K) 10b. The wavelength division multiplexing apparatus includes a reception-side measurement apparatus 4, a control apparatus 60, a plurality of main signal transmission/reception apparatuses 61, a MUX/DEMUX apparatus 62, a plurality of reception-side amplification apparatuses 63, and a plurality of transmission-side amplification apparatuses 64. Elements similar to those in FIG. 16 are denoted by similar reference symbols, and a further description thereof is omitted.

The reception-side measurement apparatus 4 communicates with the transmission-side measurement apparatus 3 via the control apparatus 60 to perform the measurement process. In this process, the control apparatus 60 sets the MUX/DEMUX apparatus 62 such that the pulsed light Pa and the pulsed light Pb with wavelengths λa and λb output from the transmission-side measurement apparatus 3 are input to the reception-side measurement apparatus 4 from the transmission-side amplification apparatus 64 corresponding to the route to be measured. The reception-side measurement apparatus 4 transmits parameters acquired as a result of the measurement process to the network management apparatus 5 via the control apparatus 60. Based on the route information received from the network management apparatus 5, the control apparatus 60 sets the MUX/DEMUX apparatus 62 such that a light signal input from the reception-side amplification apparatus 63 is output to one of the main signal transmission/reception apparatuses 61. For example, the setting is performed on the wavelength selectable switches.

Note that the configurations described above with reference to FIG. 16 and FIG. 17 are similar to wavelength division multiplexing apparatuses disposed at other relay nodes (B) to (J) 10c. In a case where the relay nodes (B) to (J) 10c are managed by the network management apparatus 5, the control apparatus 60 receives the route information from the network management apparatus 5. The control apparatus 60 determines the wavelength of the light signal and the direction in which the light signal is to be transmitted based on the route information, and the control apparatus 60 sets the MUX/DEMUX apparatus 62 according to the determination. Thus, the route is set which extends from the transmission-side node (A) 10a to the reception-side node (K) 10b via the relay nodes (B) to (J) 10c.

Figure 18:
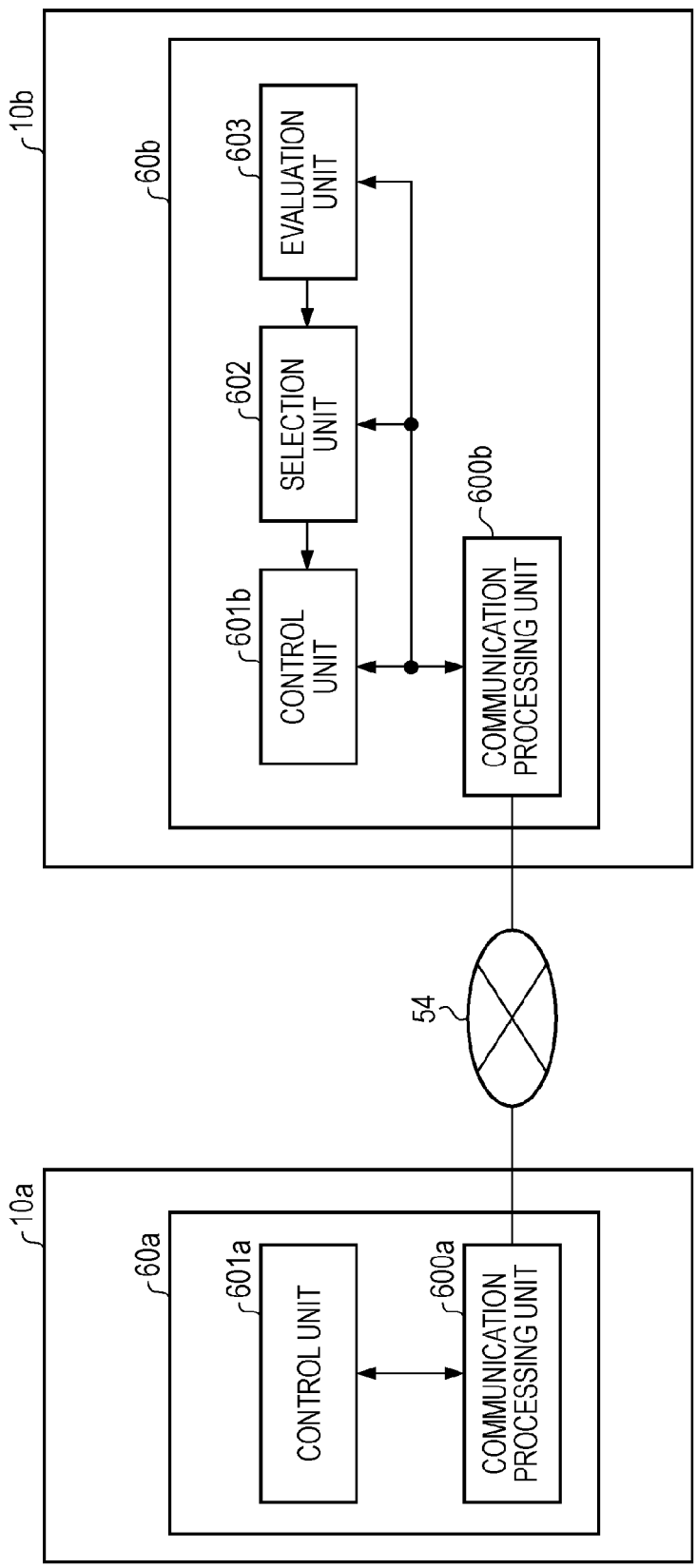
FIG. 18 is a diagram illustrating a configuration of a control apparatus in a wavelength division multiplexing apparatus.

Note that instead of implementing the function of setting the route in the network management apparatus 5, this function may be implemented in a transmission system including the transmission-side node (A) 10a and the reception-side node (K) 10b illustrated in FIG. 16 and FIG. 17. FIG. 18 illustrates a configuration of the control apparatus 60 for a case in which the function of setting the route is implemented in the reception-side node (K) 10b. In FIG. 18, 60a denotes the control apparatus 60 disposed at the transmission-side node (A) 10a, and 60b denotes the control apparatus 60 disposed at the reception-side node (K) 10b.

The control apparatus 60a disposed at the transmission-side node (A) 10a includes a communication processing unit 600a and a control unit 601a. The control apparatus 60b disposed at the reception-side node (K) 10b includes a communication processing unit 600b, a control unit 601b, a selection unit 602, and an evaluation unit 603. The communication processing unit 600a and the control unit 601a may be realized, for example, using a processor and a memory shared by these units, and/or a dedicated processor and memory. The communication processing unit 600b, the control unit 601b, the selection unit 602, and the evaluation unit 603 may be realized, for example, using a processor and a memory shared by these units, and/or a dedicated processor and memory.

The communication processing unit 600a processes communications among a plurality of main signal transmission/reception apparatuses 61, a MUX/DEMUX apparatus 62, and the transmission-side measurement apparatus 3. On the other hand, the communication processing unit 600b processes communications among a plurality of main signal transmission/reception apparatuses 61, a MUX/DEMUX apparatus 62, and the reception-side measurement apparatus 4.

As with the evaluation unit 53 described above, the evaluation unit 603 acquires at least one of the parameters measured by the measurement unit 43 via the communication processing unit 600b and evaluates the transmission performance of each of the routes between the transmission-side node (A) 10a and the reception-side node (K) 10b based on the acquired one or more parameters. As with the selection unit 52 described above, the selection unit 602 selects one of routes based on a result of the evaluation performed by the evaluation unit 603.

The control units 601a and 601b control the main signal transmission/reception apparatuses 61 such that a light signal is transmitted/received between the transmission-side node (A) 10a and the reception-side node (K) 10b via the route selected by the selection unit 602. As described above, the control units 601a and 601b set the plurality of main signal transmission/reception apparatuses 61 and the MUX/DEMUX apparatus 62 based on the route information indicating the route selected by the selection unit 602. In this process, the control unit 601b at the reception-side node (K) 10b receives the route information from the control unit 601a disposed at the transmission-side node (A) 10a via the communication processing units 600a and 600b.

In the transmission system according to the present embodiment, the route in the optical network 1 is determined using the parameters measured by the measurement apparatuses 3 and 4 and controls the main signal transmission/reception apparatuses 61 and the MUX/DEMUX apparatus 62 such that communication is performed via the determined route. Thus, the transmission system according to the present embodiment simplifies the designing and the setting of the route.

In the present embodiment, the selection unit 602 and the evaluation unit 603 are disposed in the control unit 601b of the reception-side node (K) 10b. Alternatively, they may be disposed in the control unit 601a of the transmission-side node (A) 10a. In this case, the control unit 601b of the reception-side node (K) 10b acquires the parameters obtained as a result of the measurement from the measurement unit 43 and transfers them to the measurement unit 43 of the measurement unit 43 via the communication processing unit 600b. In response, the control unit 601a sets the route based on the received parameters.

In the present embodiment, the control units 601a and 601b are disposed such that one is disposed at the transmission-side node (A) 10a and the other is disposed at the reception-side node (K) 10b. Alternatively, the control unit may be disposed at only one of the transmission-side node (A) 10a and the reception-side node (K) 10b. In this case, an apparatus at the other node 10a or 10b may set the route via the network management apparatus 5.

Figure 19:
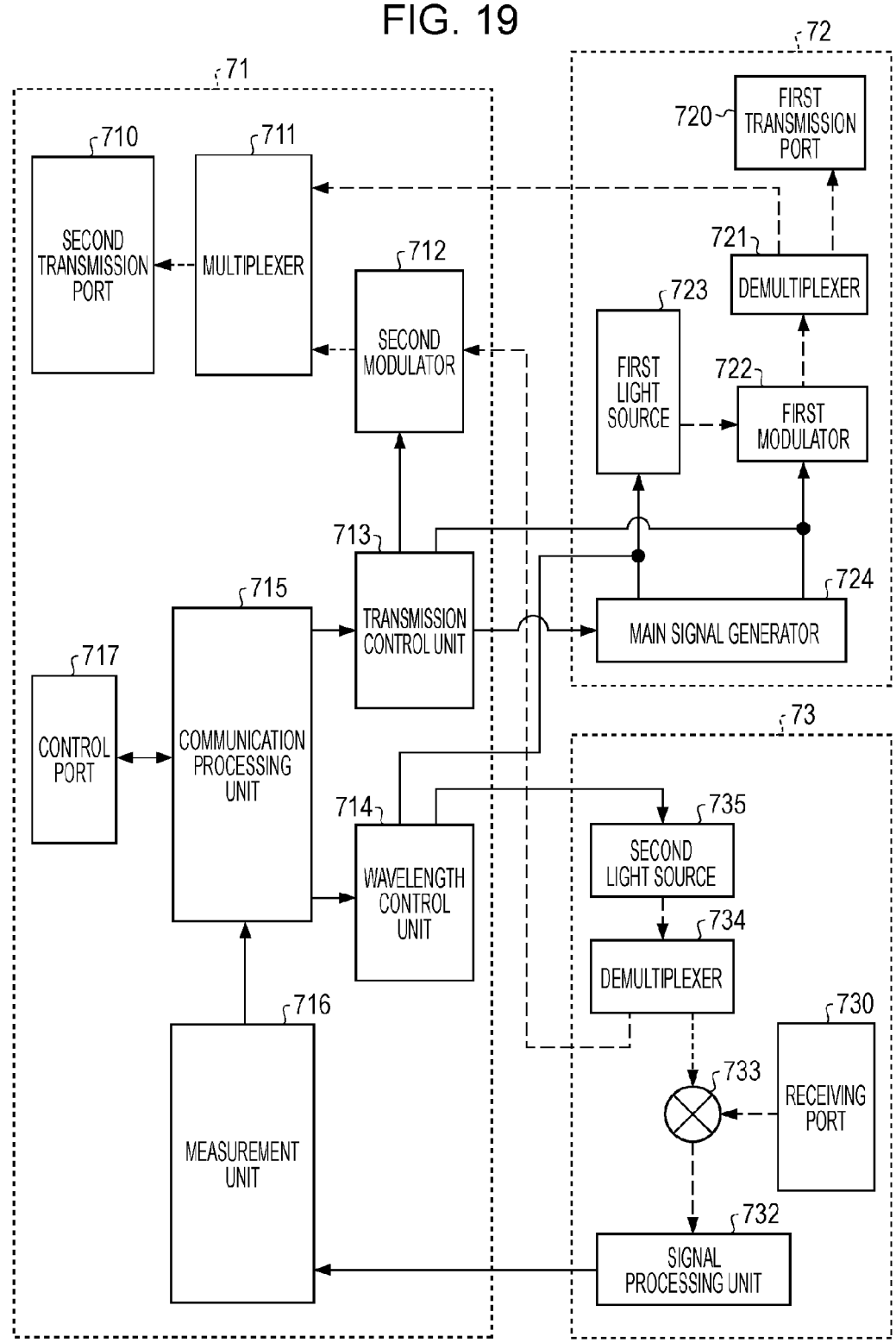
FIG. 19 is a diagram illustrating a configuration of a communication apparatus having functions of a measurement apparatus and a main signal transmission/reception apparatus.

In the embodiments described above, the measurement apparatuses 3 and 4 and the main signal transmission/reception apparatuses 61 are separate apparatuses. Alternatively, they may be integrated in a single apparatus. FIG. 19 illustrates a configuration of a communication apparatus having the functions of the measurement apparatuses 3 and 4 and the main signal transmission/reception apparatuses 61.

This communication apparatus includes a measurement processing unit 71, a transmission processing unit 72, and a reception processing unit 73. The transmission processing unit 72 includes a first transmission port 720, a demultiplexer 721, a first modulator 722, a first light source 723, and a main signal generation unit 724. The reception processing unit 73 includes a reception port 730, a signal processing unit 732, a mixer 733, a demultiplexer 734, and a second light source 735. The measurement processing unit 71 includes a second transmission port 710, a multiplexer 711, a second modulator 712, a transmission controller 713, a wavelength controller 714, a communication processing unit 715, a measurement unit 716, and a control port 717. The signal processing unit 732, the transmission controller 713, the wavelength controller 714, the communication processing unit 715, and the measurement unit 716 may be realized, for example, using a processor and a memory shared by these units, and/or a dedicated processor and memory.

First, the transmission processing unit 72 is explained. The first light source 723 is a wavelength variable light source configured to output light with a wavelength controlled by the main signal generation unit 724 or the wavelength controller 714. The first modulator 722 is, for example, a LN modulator configured to generate a main signal from the light output from the first light source 723 under the control of the main signal generation unit 724. The first modulator 722 also generates the pulsed light Pa described above from the light output from the first light source 723 under the control of the transmission controller 713.

That is, the first light source 723 and the first modulator 722 generate one of the main signal and pulsed light Pa. In a case where the pulsed light Pa is generated, the transmission controller 713 sends a disable signal to the main signal generation unit 724 to control the main signal generation unit 724 not to generate the main signal.

The demultiplexer 72 is, for example, a photo coupler configured to output the light received from the first modulator 722 to the first transmission port 720 and the multiplexer 711 of the measurement processing unit 71. The first transmission port 720 is a port for transmitting the main signal, and the first transmission port 720 may be realized, for example, by an optical connector.

Next, the reception processing unit 73 is explained. The reception port 730 is a port for receiving the main signal or the pulsed light Pa and the pulsed light Pb described above, and the reception port 730 may be realized, for example, by an optical connector.

The second light source 735 is a wavelength variable light source configured to output a light with a wavelength controlled by the wavelength controller 714. The demultiplexer 734 is, for example, a photo coupler, and is configured to output the light received from the second light source 735 to the mixer 733 and the second modulator 712. The mixer 733 mixes the light output from the second light source 735 and received via the demultiplexer 734 and the light signal received from the reception port 730.

The signal processing unit 732 converts the light signal input from the mixer 733 into an electric signal. Furthermore, the signal processing unit 732 measures the time difference τr described above from the pulsed light Pa and the pulsed light Pb input from the mixer 733 and detects a change in an optical phase of one of the pulsed light Pa and the pulsed light Pb. That is, the signal processing unit 732 has functions similar to those of the fluctuation detection unit 41 and the time difference detector 42 illustrated in FIG. 9. The signal processing unit 732 outputs the measured time difference τr and the detection signal indicating the change in an optical phase to the measurement unit 716.

Next, measurement processing unit 71 is explained below. As with the transmission controller 33 illustrated in FIG. 9, the transmission controller 713 controls the first modulator 722 and the second modulator 712 so as to transmit the pulsed light Pa and the pulsed light Pb repeatedly while changing the time interval τt. Thus, the pulsed light Pa and the pulsed light Pb are output respectively from the first modulator 722 and the second modulator 712. When the measurement is performed, the transmission controller 713 sends the disable signal described above to the main signal generation unit 724 to control the main signal generation unit 724 not to generate the main signal. As with the wavelength controller 32 illustrated in FIG. 9, the wavelength controller 714 sets the first light source 723 and the second light source 735 such that they output a light with wavelengths λa and λb, respectively.

As with the measurement unit 43 illustrated in FIG. 9, the measurement unit 716 receives the time difference τr and the detection signal indicating the change in an optical phase, and the measures the parameters based thereon. The communication processing unit 715 is connected to another apparatus via a control port 717. The control port 717 is, for example, a communication connector such as a RJ-45 connector.

As with the communication processing units 34 and 44 illustrated in FIG. 9, the communication processing unit 715 processes a communication. More specifically, the communication processing unit 715 processes a communication between the transmission-side node (A) 10a and the reception-side node (K) 10b. Thus, the measurement unit 616 transmits and receives a control signal to or from the transmission controller 613 and the wavelength controller 614 disposed at the transmission-side node (A) 10a.

By configuring the measurement apparatuses 3 and 4 and the main signal transmission/reception apparatus 61 in the form of the integrated single apparatus as described above, it may be possible to reduce the installation space and reduce the total size of the apparatus.

Additional notes for the embodiments

Note 1. A network design apparatus comprising: a measurement apparatus that includes: a transmitter disposed at a transmission-side node in an optical network and configured to transmit two pulsed lights with wavelengths different from each other at time intervals to a reception-side node in the optical network, a transmission controller configured to control the transmitter so as to transmit the two pulsed lights repeatedly while changing the time interval, a receiving unit disposed at the reception-side node and configured to receive the two pulsed lights from the transmitter via one or more relay nodes in the optical network, a detection unit configured to detect a change in an optical phase of at least one of the two pulsed lights received by the receiving unit, and a measurement unit configured to measure, based on the time interval and the change in an optical phase detected by the detection unit, a dispersion value of each transmission line between two nodes of nodes including the transmission-side node, the reception-side node, and the one or more relay nodes; and an evaluation unit configured to acquire at least one of parameters measured by the measurement unit from the measurement apparatus, and evaluate a transmission performance of one or more routes between the transmission-side node and the reception-side node based on the parameters.

Note 2. The network design apparatus according to note 1, further comprising a selection unit configured to select one of the routes based on a result of the evaluation performed by the evaluation unit.

Note 3. A network management apparatus, comprising: a measurement apparatus that includes: a transmitter disposed at a transmission-side node in an optical network and configured to transmit two pulsed lights with wavelengths different from each other at time intervals to a reception-side node in the optical network; a transmission controller configured to control the transmitter so as to transmit the two pulsed lights repeatedly while changing the time interval; a receiving unit disposed at the reception-side node and configured to receive the two pulsed lights from the transmitter via one or more relay nodes in the optical network; a detection unit configured to detect a change in an optical phase of at least one of the two pulsed lights received by the receiving unit; and a measurement unit configured to measure, based on the time interval and the change in an optical phase detected by the detection unit, a dispersion value of each transmission line between two nodes of nodes including the transmission-side node, the reception-side node, and the one or more relay nodes; an evaluation unit configured to acquire at least one of parameters measured by the measurement unit from the measurement apparatus and evaluate a transmission performance for a plurality of routes between the transmission-side node and the reception-side node based on the parameters; a selection unit configured to select one of the routes based on a result of the evaluation performed by the evaluation unit; and an apparatus control unit configured to control a plurality of transmission apparatuses in the optical network such that a light signal is transmitted and received between the transmission apparatus and the receiving apparatus via the route selected by the selection unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A measurement apparatus, comprising:
   a transmitter disposed at a transmission-side node in an optical network and configured to transmit two pulsed lights with wavelengths different from each other at time intervals to a reception-side node in the optical network;
   a transmission controller configured to control the transmitter so as to transmit the two pulsed lights repeatedly while changing the time interval;
   a receiving unit disposed at the reception-side node and configured to receive the two pulsed lights from the transmitter via one or more relay nodes in the optical network;
   a detection unit configured to detect a change in an optical phase of at least one of the two pulsed lights received by the receiving unit; and
   a measurement unit configured to measure, based on the time interval and the change in an optical phase detected by the detection unit, a dispersion value of each transmission line between two nodes of nodes including the transmission-side node, the reception-side node, and the one or more relay nodes.

2. The measurement apparatus according to claim 1, further comprising
   a measurement unit disposed at the reception-side node and configured to measure a time difference in time of arriving at the receiving unit between the two pulsed lights transmitted simultaneously from the transmitter, wherein
   the transmission controller acquires the time difference from the measurement unit and changes the time interval over a range from 0 to the time difference.

3. The measurement apparatus according to claim 1, further comprising a wavelength controller configured to control a wavelength difference between the two pulsed lights, wherein
   the measurement unit measures a chromatic dispersion coefficient of each transmission line between two nodes based on a relationship between a displacement of the acquired time interval and a displacement of the wavelength difference.

4. The measurement apparatus according to claim 3, wherein the measurement unit measures a distance of each transmission line based on the dispersion value and the chromatic dispersion coefficient.

5. A measurement apparatus, comprising:
   a transmitter disposed at a transmission-side node in an optical network and configured to transmit two pulsed lights with wavelengths different from each other at time intervals to a reception-side node in the optical network;
   a transmission controller configured to control the transmitter so as to transmit the two pulsed lights repeatedly while changing the time interval;
   a receiving unit disposed at the reception-side node and configured to receive the two pulsed lights from the transmitter via one or more relay nodes in the optical network;
   a detection unit configured to detect a change in an optical phase of at least one of the two pulsed lights received by the receiving unit; and
   a measurement unit configured to measure, based on a number of times a change in an optical phase is detected by the detection unit, a number of relay nodes between the transmission-side node and the reception-side node.

6. A transmission system, comprising:
   a measurement apparatus that includes:
   a transmitter disposed at a transmission-side node in an optical network and configured to transmit two pulsed lights with wavelengths different from each other at time intervals to a reception-side node in the optical network,
   a transmission controller configured to control the transmitter so as to transmit the two pulsed lights repeatedly while changing the time interval,
   a receiving unit disposed at the reception-side node and configured to receive the two pulsed lights from the transmitter via one or more relay nodes in the optical network,
   a detection unit configured to detect a change in an optical phase of at least one of the two pulsed lights received by the receiving unit, and
   a measurement unit configured to measure, based on the time interval and the change in an optical phase detected by the detection unit, a dispersion value of each transmission line between two nodes of nodes including the transmission-side node, the reception-side node, and the one or more relay nodes;
   a transmission apparatus disposed at the transmission-side node and configured to transmit a light signal;

a receiving apparatus disposed at the reception-side node and configured to receive a light signal; and a control apparatus disposed at least one of the transmission-side node and the reception-side node, the control apparatus including an evaluation unit configured to acquire at least one of parameters measured by the measurement unit and evaluate a transmission performance for a plurality of routes between the transmission-side node and the reception-side node based on the parameters, a selection unit configured to select one of the routes based on a result of the evaluation performed by the evaluation unit, and a control unit configured to control the transmission apparatus or the receiving apparatus such that the light signal is transmitted and received between the transmission apparatus and the receiving apparatus via the route selected by the selection unit.

* * * * *